(12) United States Patent
Lee et al.

(10) Patent No.: US 11,903,056 B2
(45) Date of Patent: Feb. 13, 2024

(54) VOICE SIGNAL RECEIVING METHOD USING BLUETOOTH LOW POWER IN WIRELESS COMMUNICATION SYSTEM, AND APPARATUS THEREFOR

(71) Applicant: LG ELECTRONICS INC., Seoul (KR)

(72) Inventors: Hyeonjae Lee, Seoul (KR); Jinkwon Lim, Seoul (KR); Taeyoung Song, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 272 days.

(21) Appl. No.: 17/595,009

(22) PCT Filed: May 11, 2020

(86) PCT No.: PCT/KR2020/006188
§ 371 (c)(1),
(2) Date: Nov. 5, 2021

(87) PCT Pub. No.: WO2020/231132
PCT Pub. Date: Nov. 19, 2020

(65) Prior Publication Data
US 2022/0217795 A1    Jul. 7, 2022

(30) Foreign Application Priority Data

May 10, 2019    (KR) ........................ 10-2019-0055284

(51) Int. Cl.
*H04W 76/14*    (2018.01)
*H04S 3/00*    (2006.01)
*H04S 7/00*    (2006.01)

(52) U.S. Cl.
CPC .............. *H04W 76/14* (2018.02); *H04S 3/008* (2013.01); *H04S 7/30* (2013.01); *H04S 2400/01* (2013.01)

(58) Field of Classification Search
CPC .......... H04W 76/14; H04S 3/008; H04S 7/30; H04S 2400/01; H04S 7/40; H04S 7/301
(Continued)

(56) References Cited

U.S. PATENT DOCUMENTS

2013/0170655 A1*    7/2013    Satoyoshi ................ H04K 3/84
                                                              381/59
2017/0188151 A1*    6/2017    Veeramani ............... H04R 3/12

FOREIGN PATENT DOCUMENTS

JP    2017123644    7/2017
JP    2017143357    8/2017
(Continued)

OTHER PUBLICATIONS

PCT International Application No. PCT/KR2020/006188, International Search Report dated Aug. 20, 2020, 5 pages.
(Continued)

*Primary Examiner* — Eugene Yun
(74) *Attorney, Agent, or Firm* — LEE, HONG, DEGERMAN, KANG & WAIMEY

(57) ABSTRACT

In the present disclosure, a method comprising: receiving a first advertisement message for measuring a declination angle between devices; measuring each declination angle between a reference point set in the control device and positions of at least one device based on the first advertisement message, wherein the positions of the at least one device are respectively adjusted such that each declination angle satisfies a specific angle for receiving a voice signal, based on the measured respective declination angles; receiving each of a first voice signals based on the respective
(Continued)

adjusted positions from the at least one device; and measuring a volume of the received first voice signal, respectively, wherein based on the measured volume, an audio signal output angle of the at least one device is adjusted such that an audio signal received by the control device is incident at right angles to the control device.

15 Claims, 30 Drawing Sheets

(58) Field of Classification Search
USPC .......................................................... 455/41.2
See application file for complete search history.

(56) References Cited

FOREIGN PATENT DOCUMENTS

| KR | 20150009027 | 1/2015 | | |
|----|-------------|--------|---|---|
| WO | 2015194854 | 12/2015 | | |
| WO | WO-2017138182 A1 * | 8/2017 | ........... | H04R 29/002 |

OTHER PUBLICATIONS

Bluetooth SIG, "Bluetooth direction finding," A Technical Overview, version 1.0, Mar. 2019, 31 pages.

* cited by examiner

[FIG. 1]
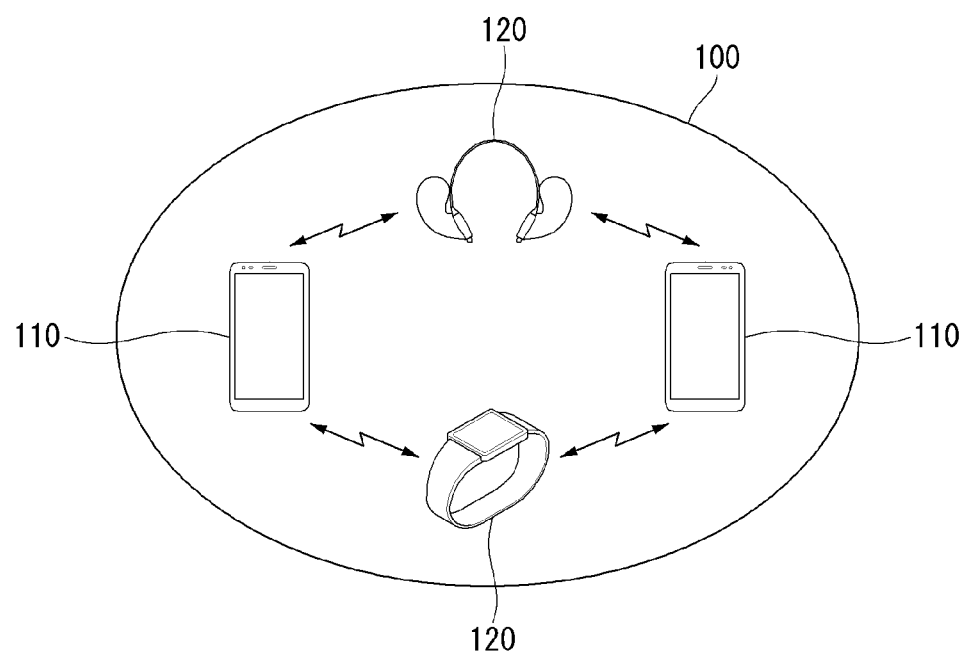

[FIG. 2]
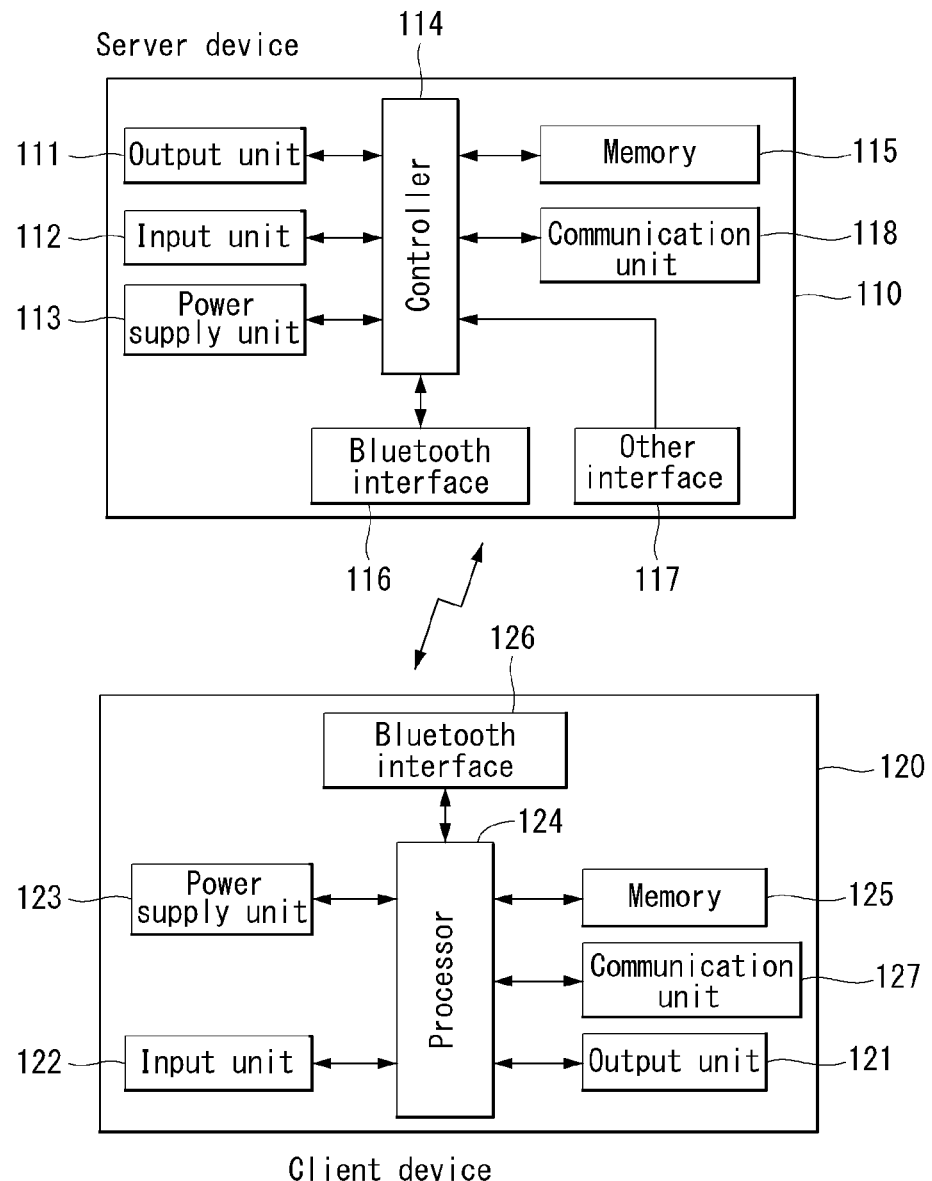

[FIG. 3]
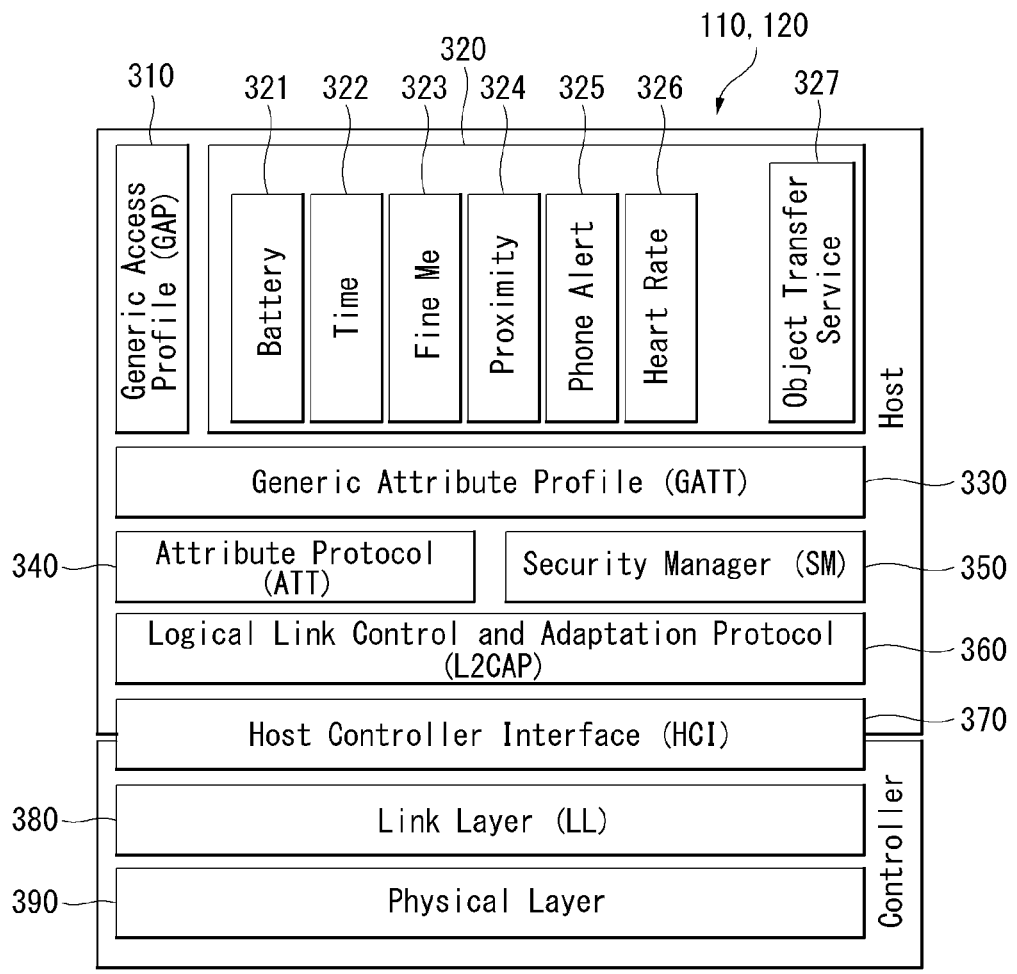

[FIG. 4]
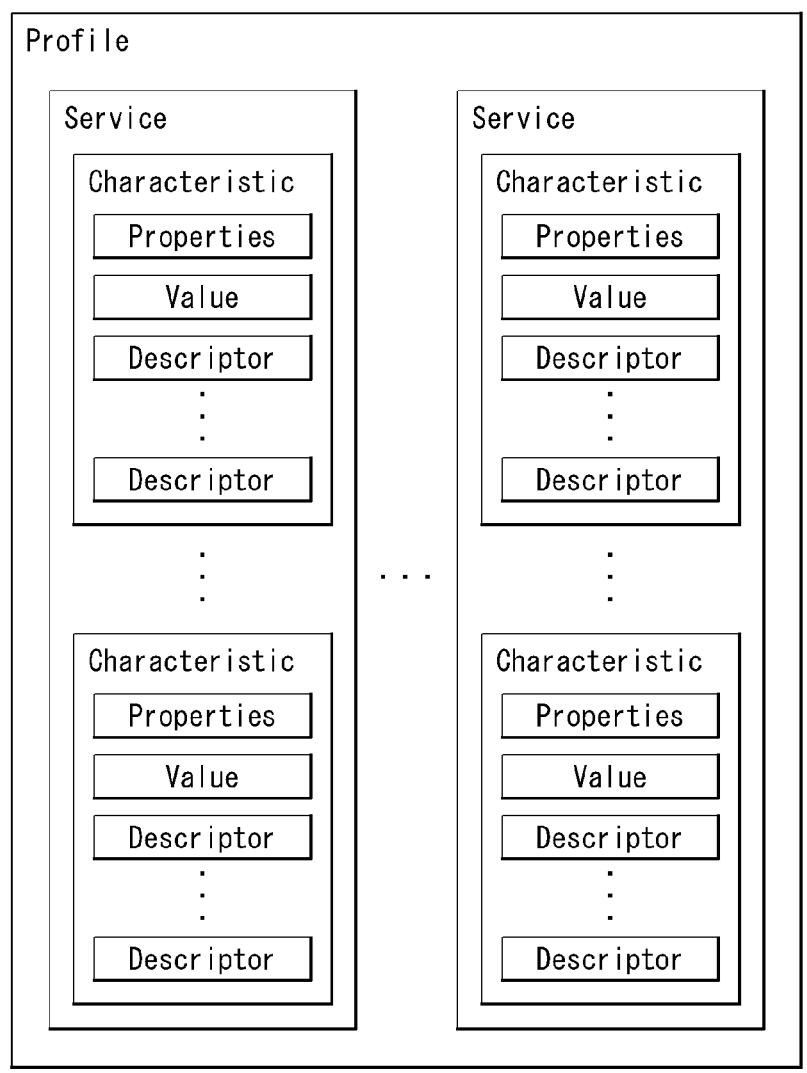

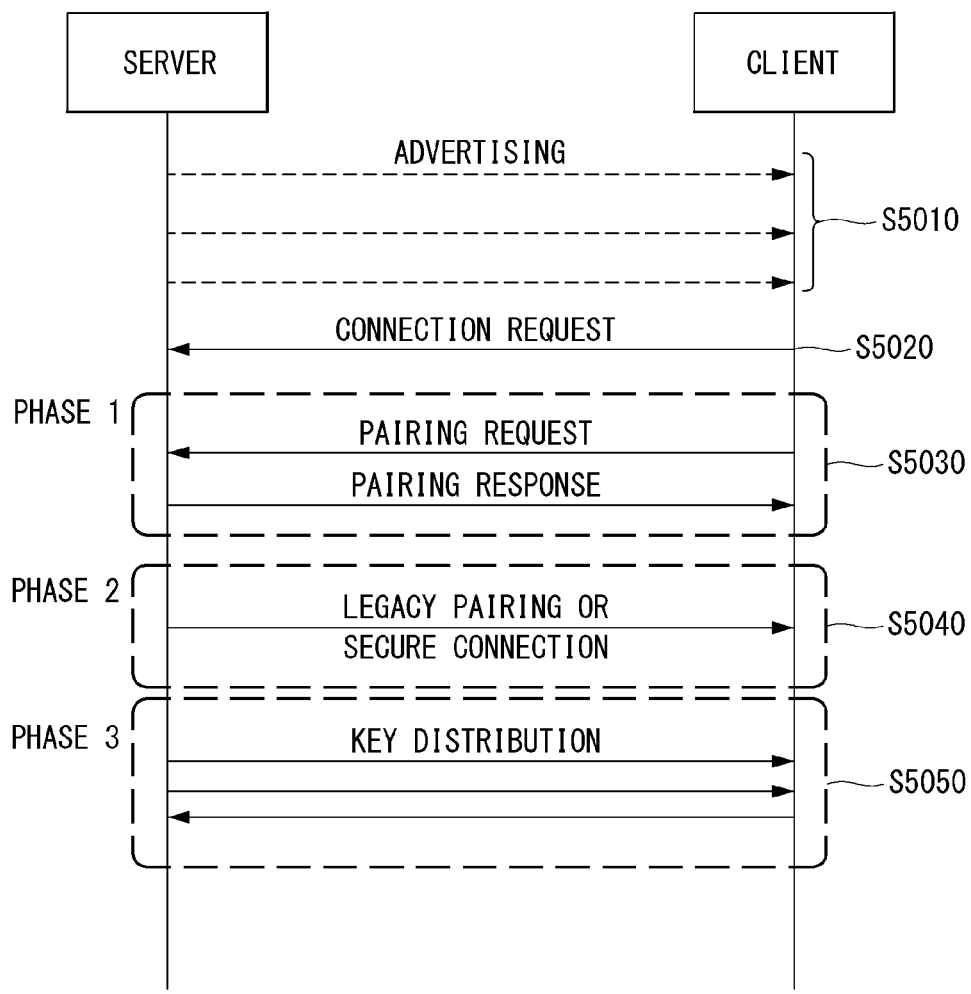
[FIG. 5]

[FIG. 6]
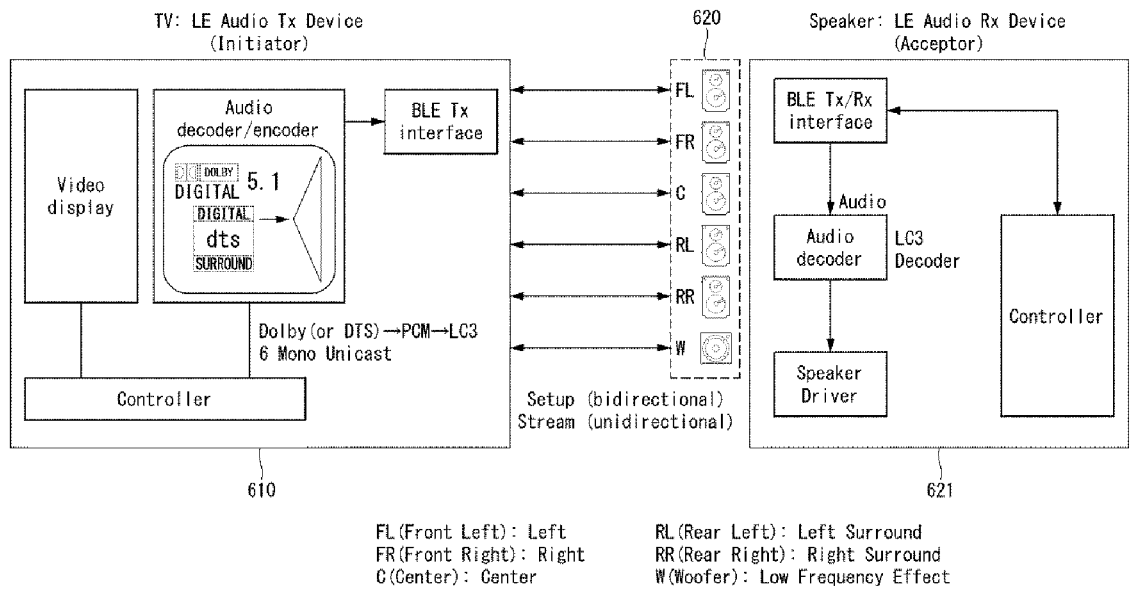
[FIG. 7]
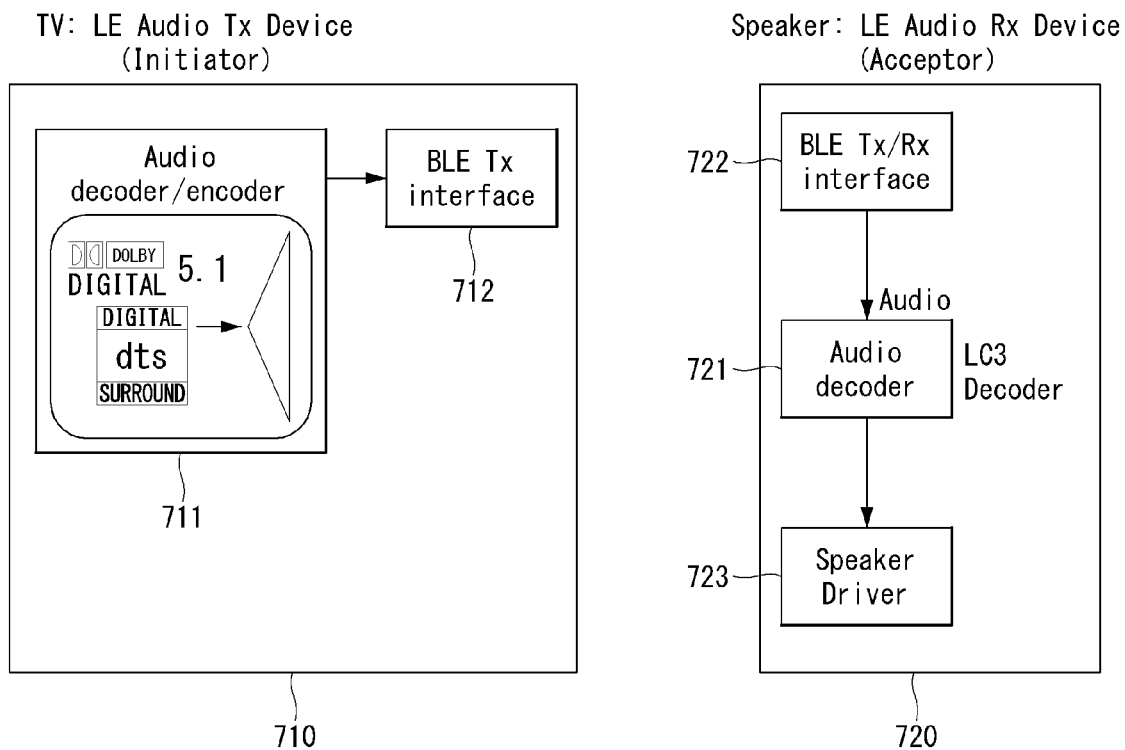

[FIG. 8]
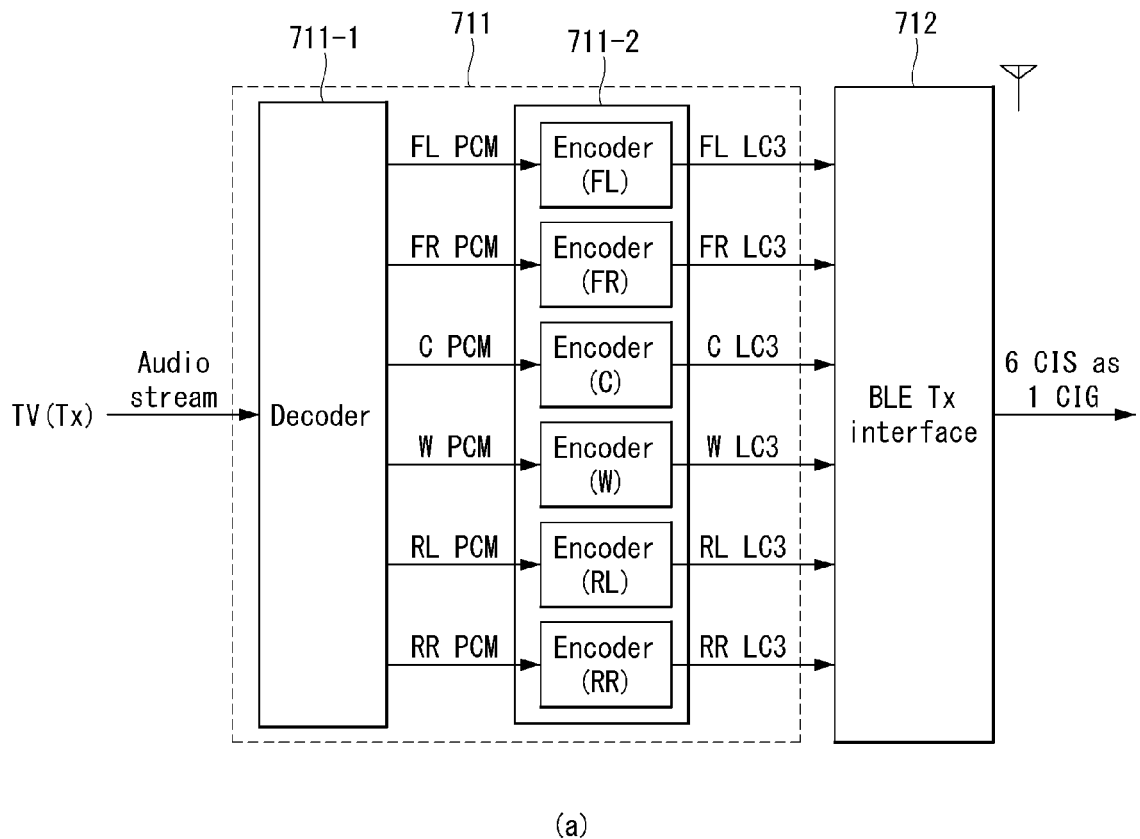
(a)
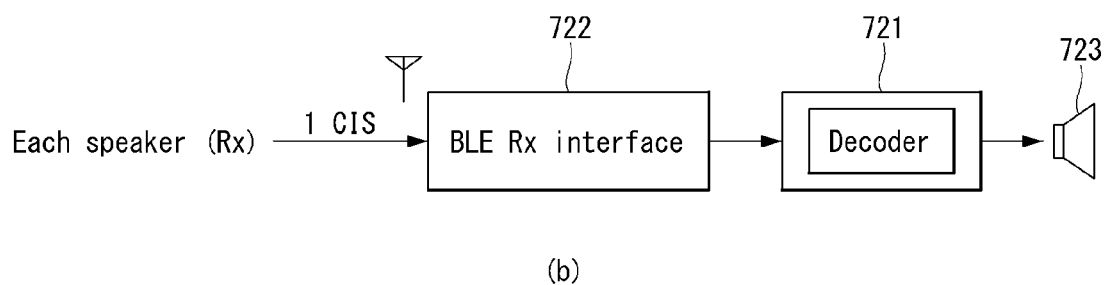
(b)

[FIG. 9]
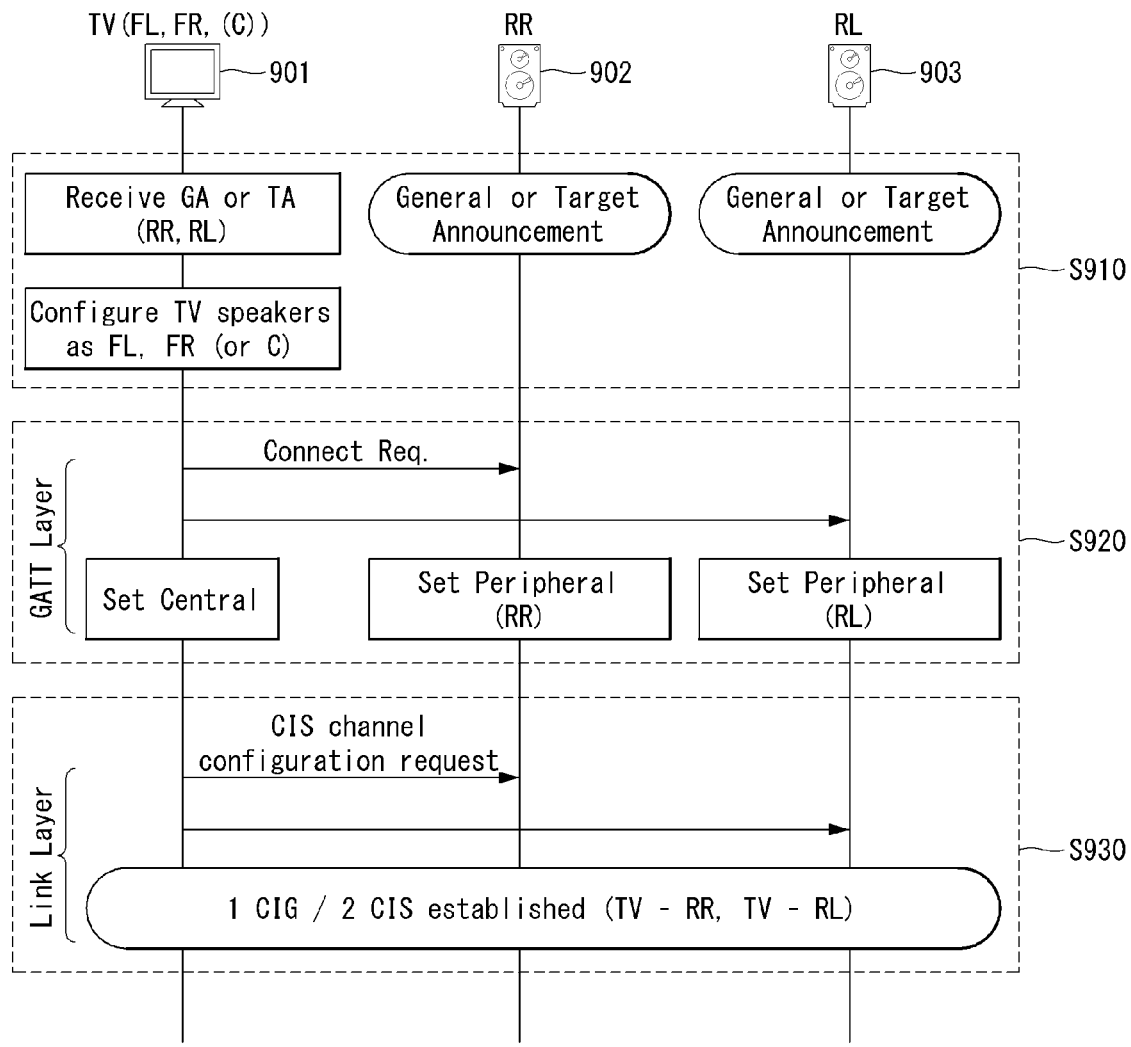

[FIG. 10]
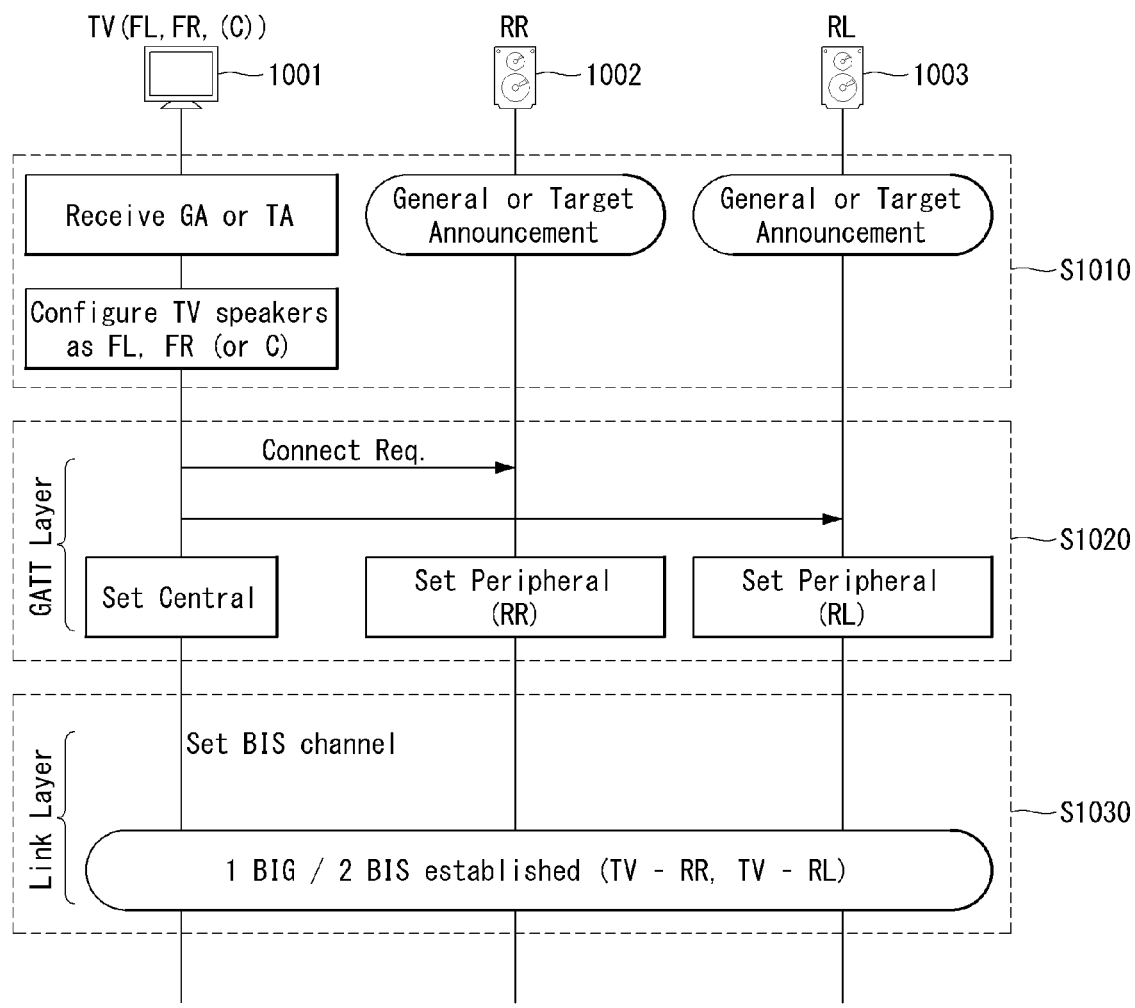

[FIG. 11]
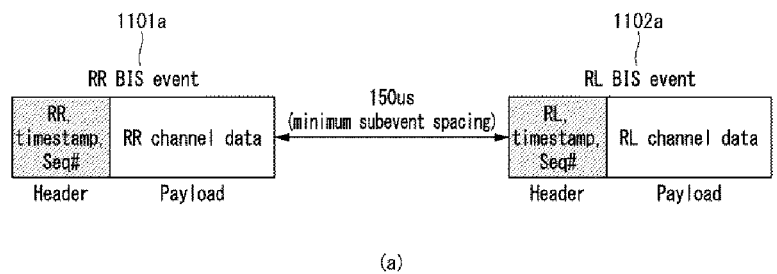
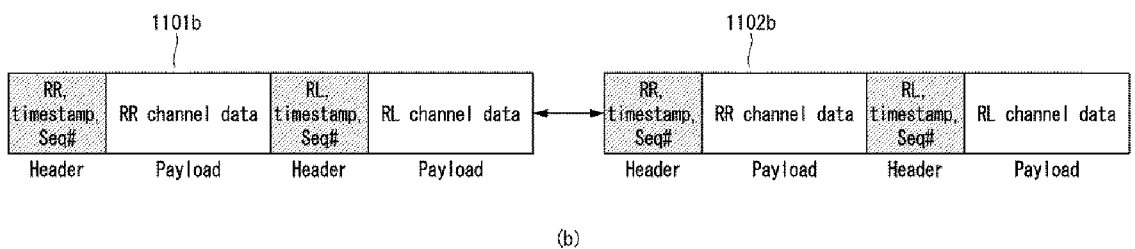

[FIG. 12]
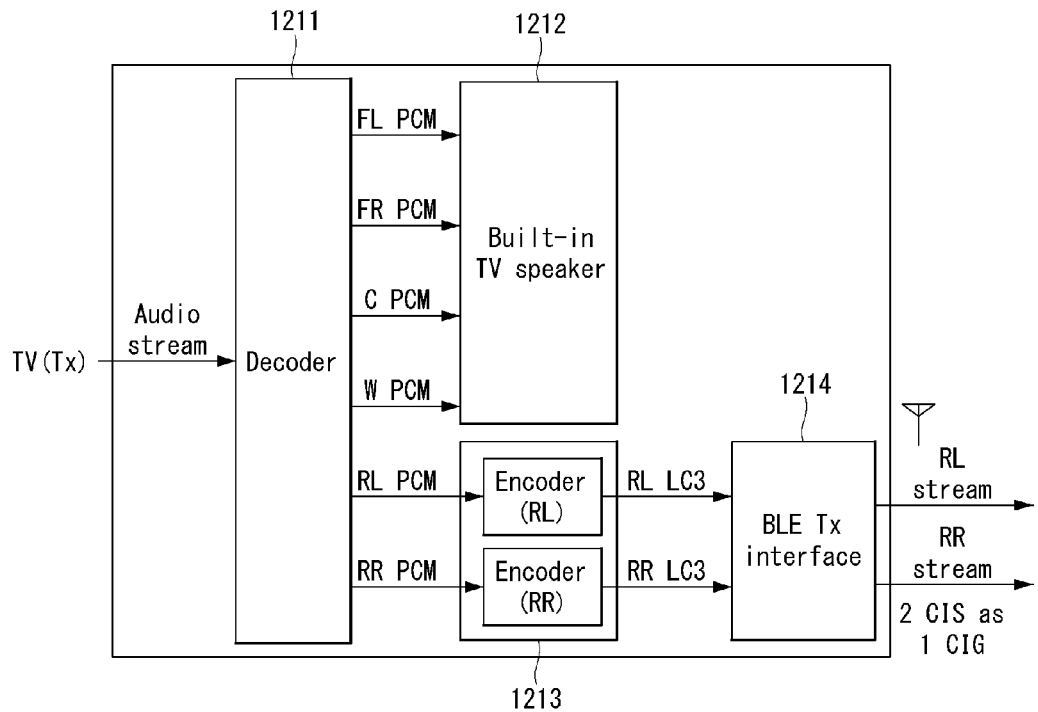
(a)
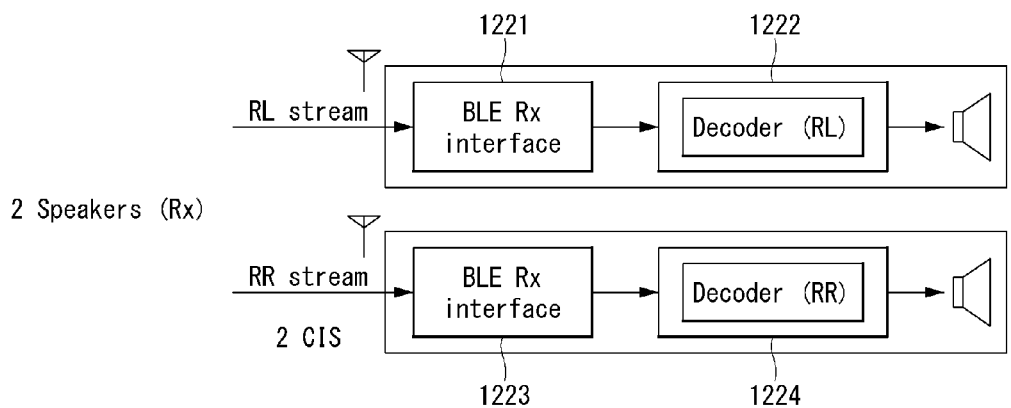
(b)

[FIG. 13]
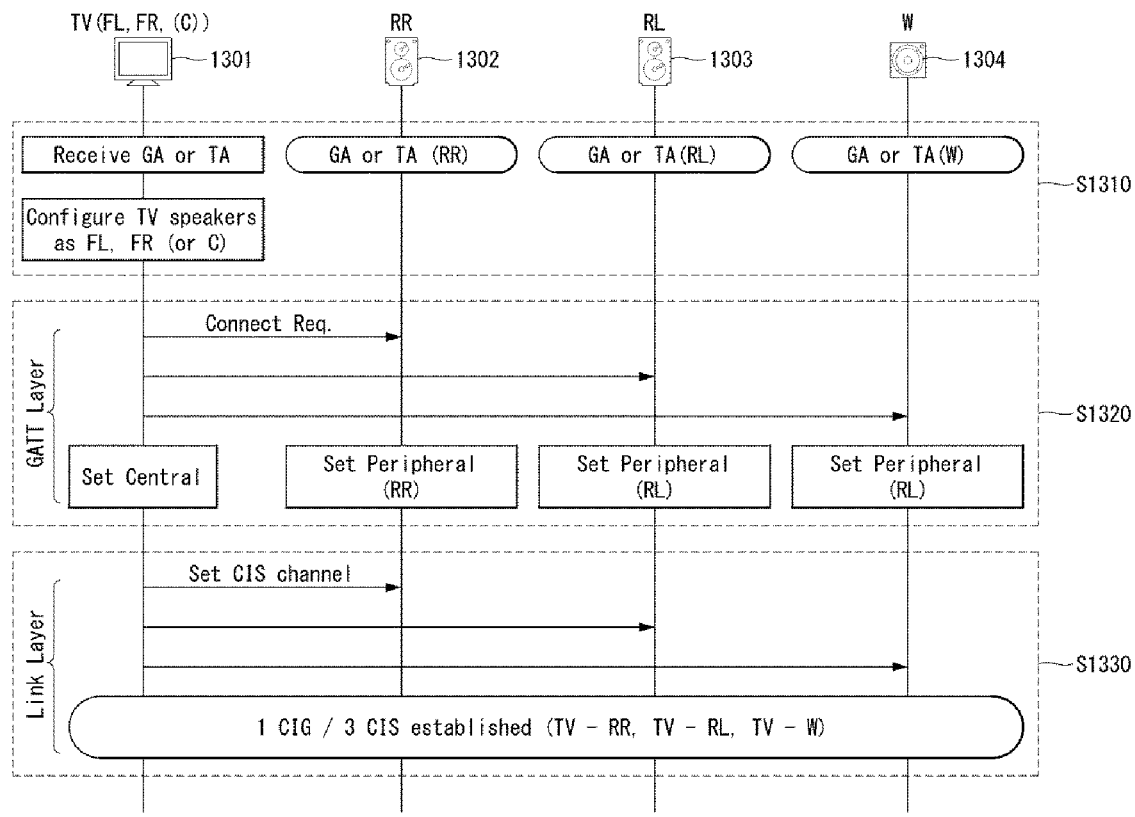

[FIG. 14]
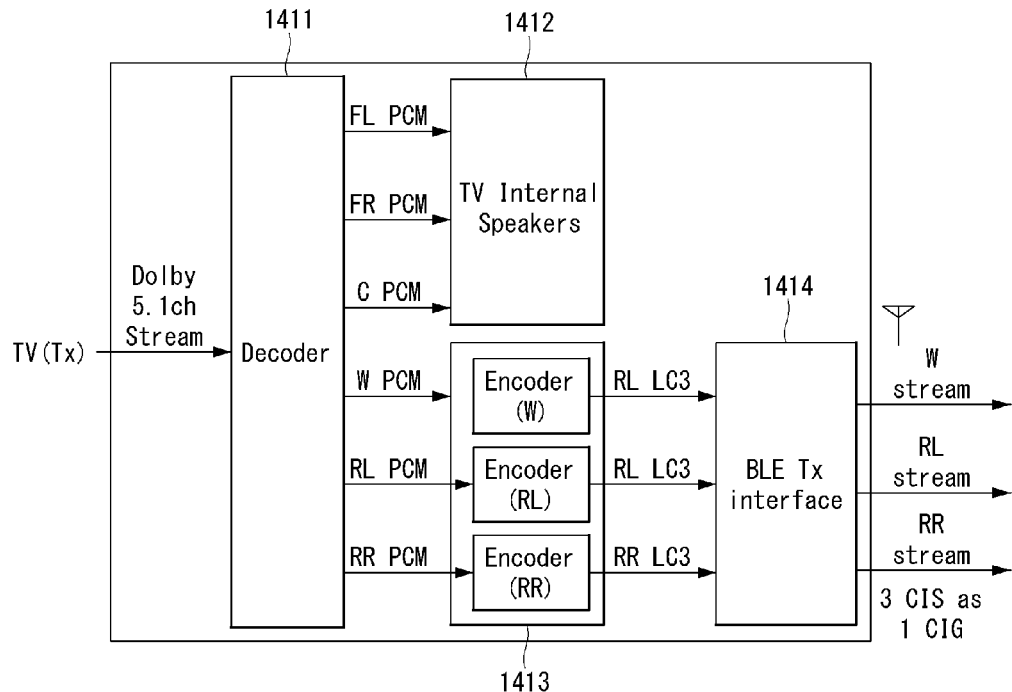
(a)
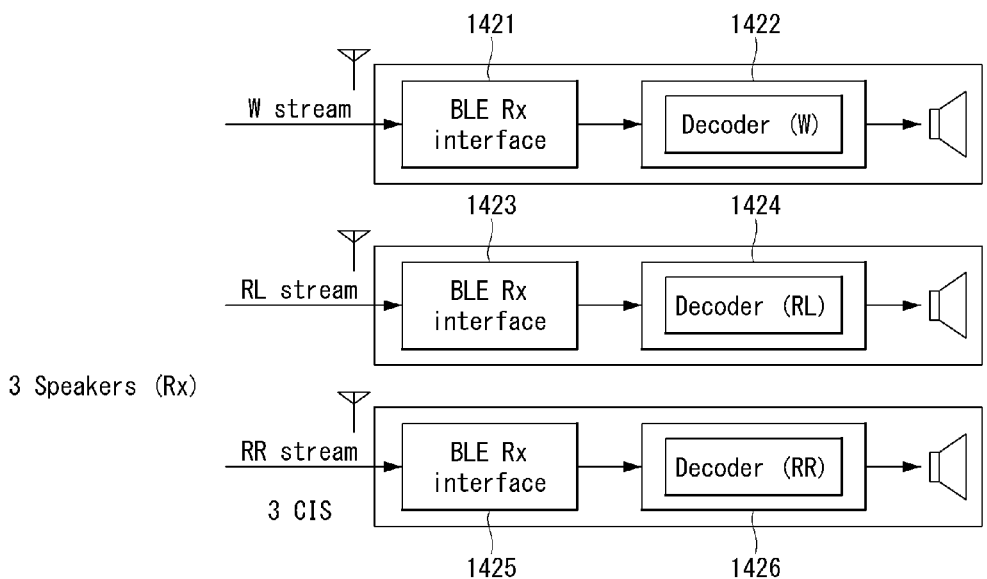
(b)

[FIG. 15]
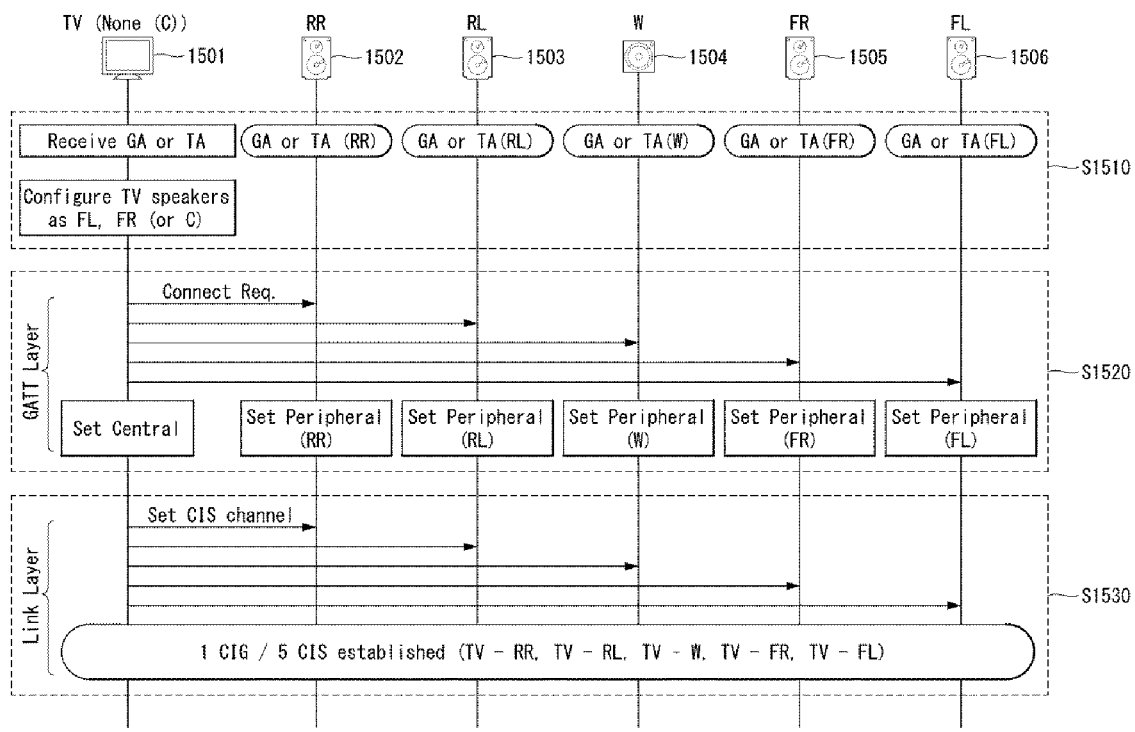

[FIG. 16]
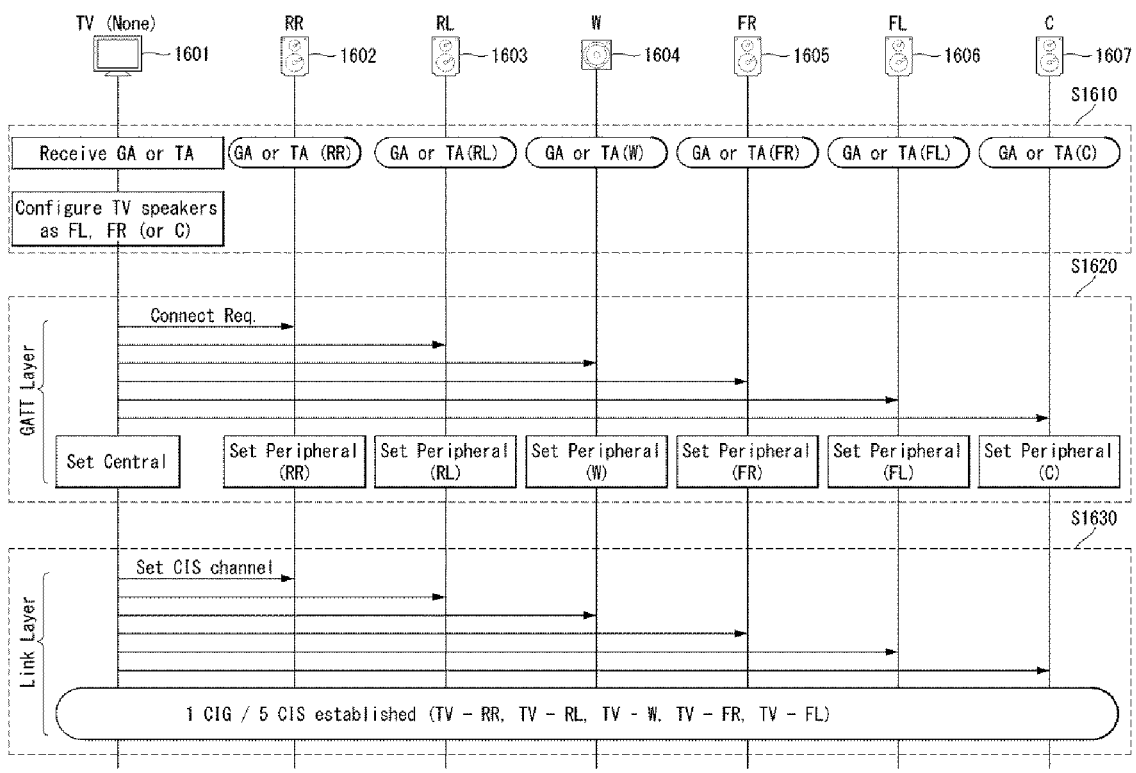

[FIG. 17]
(a)
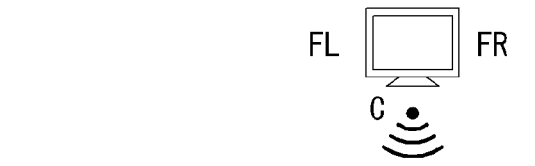
(b)
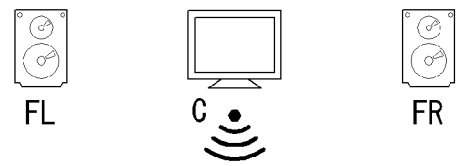
(c)
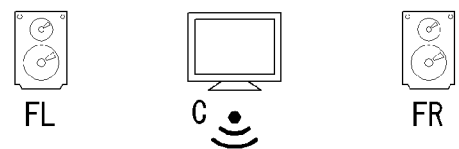

[FIG. 18]
(a) 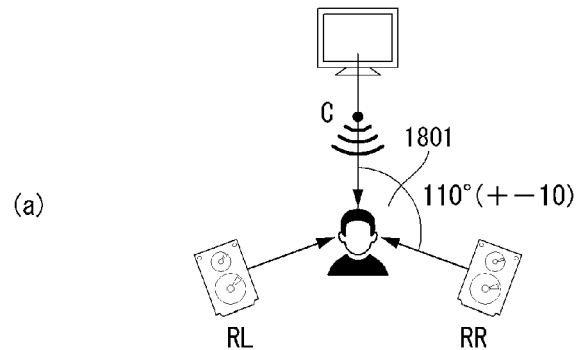
(b) 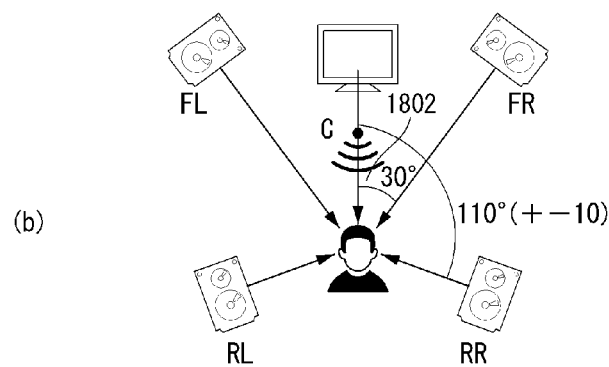
(c) 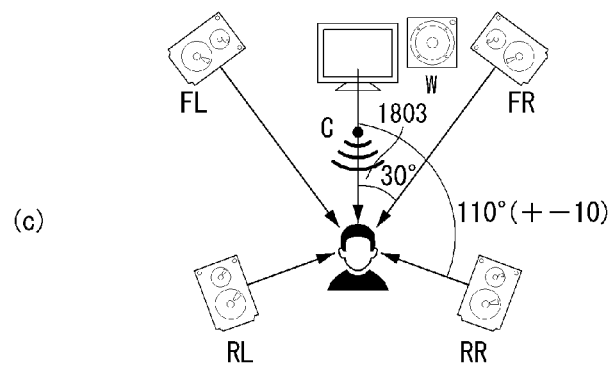

[FIG. 19]
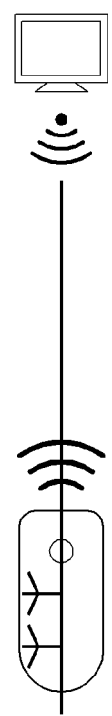 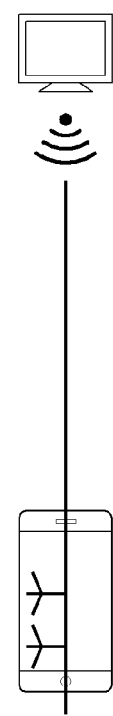
(a) (b)

[FIG. 20]
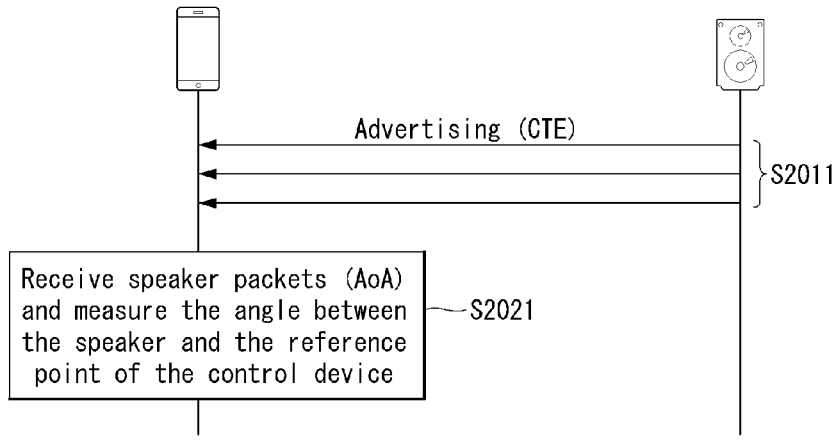
(a)
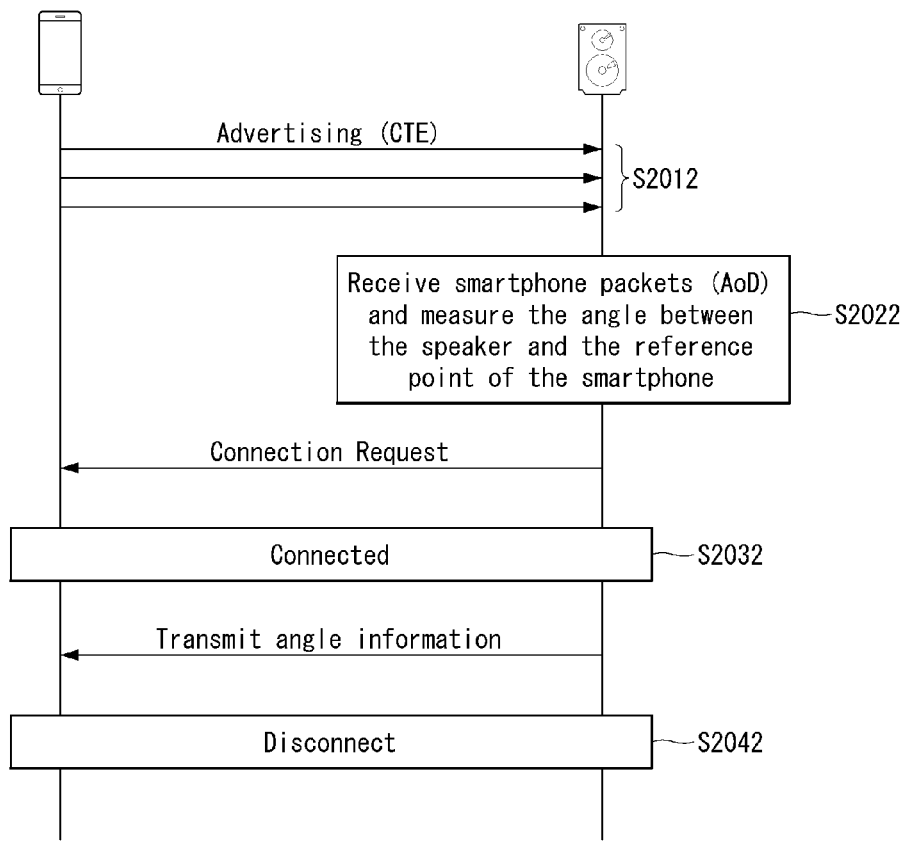
(b)

[FIG. 21]
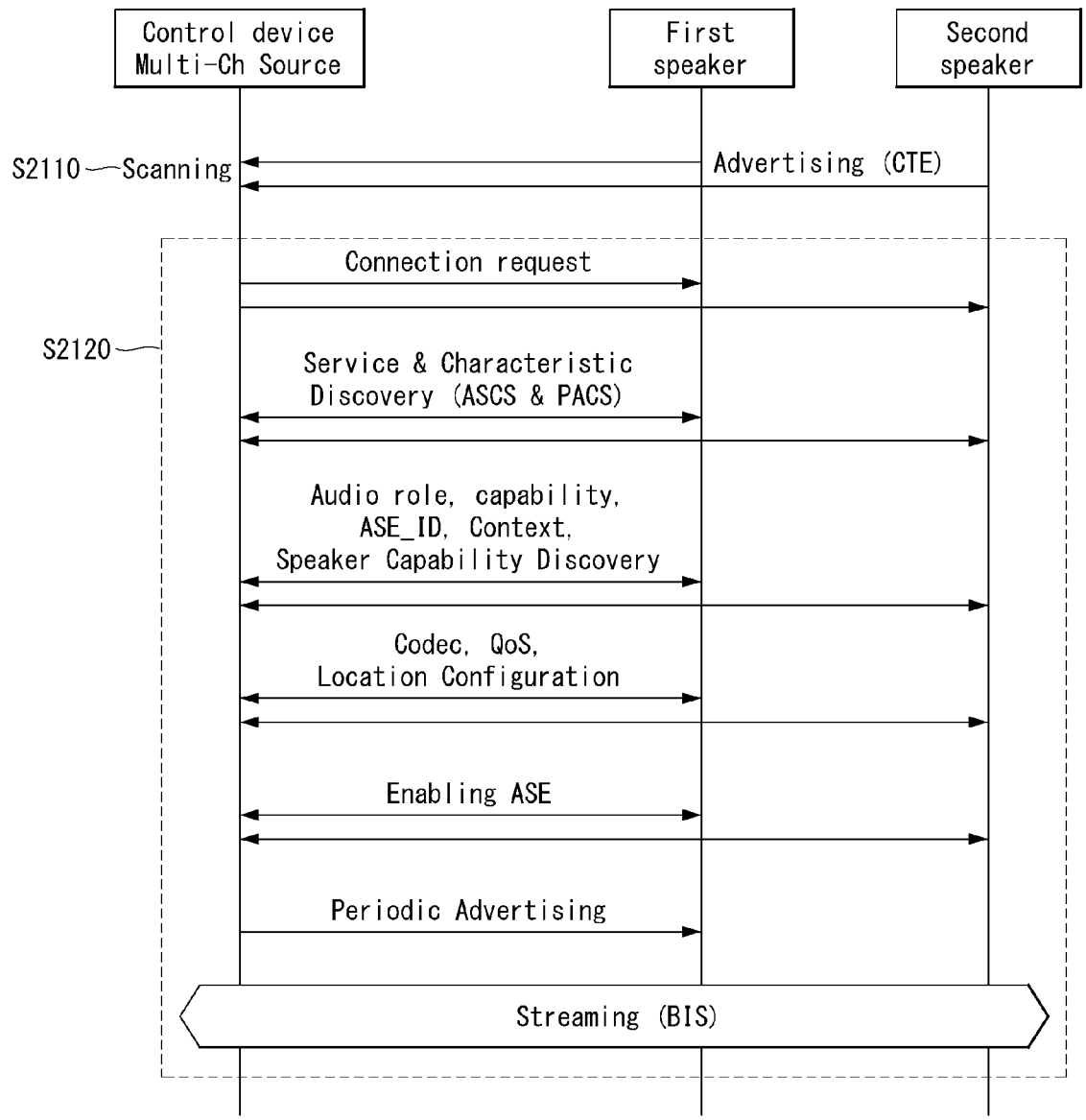

[FIG. 22]
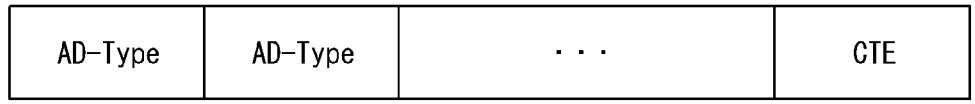
[FIG. 23]
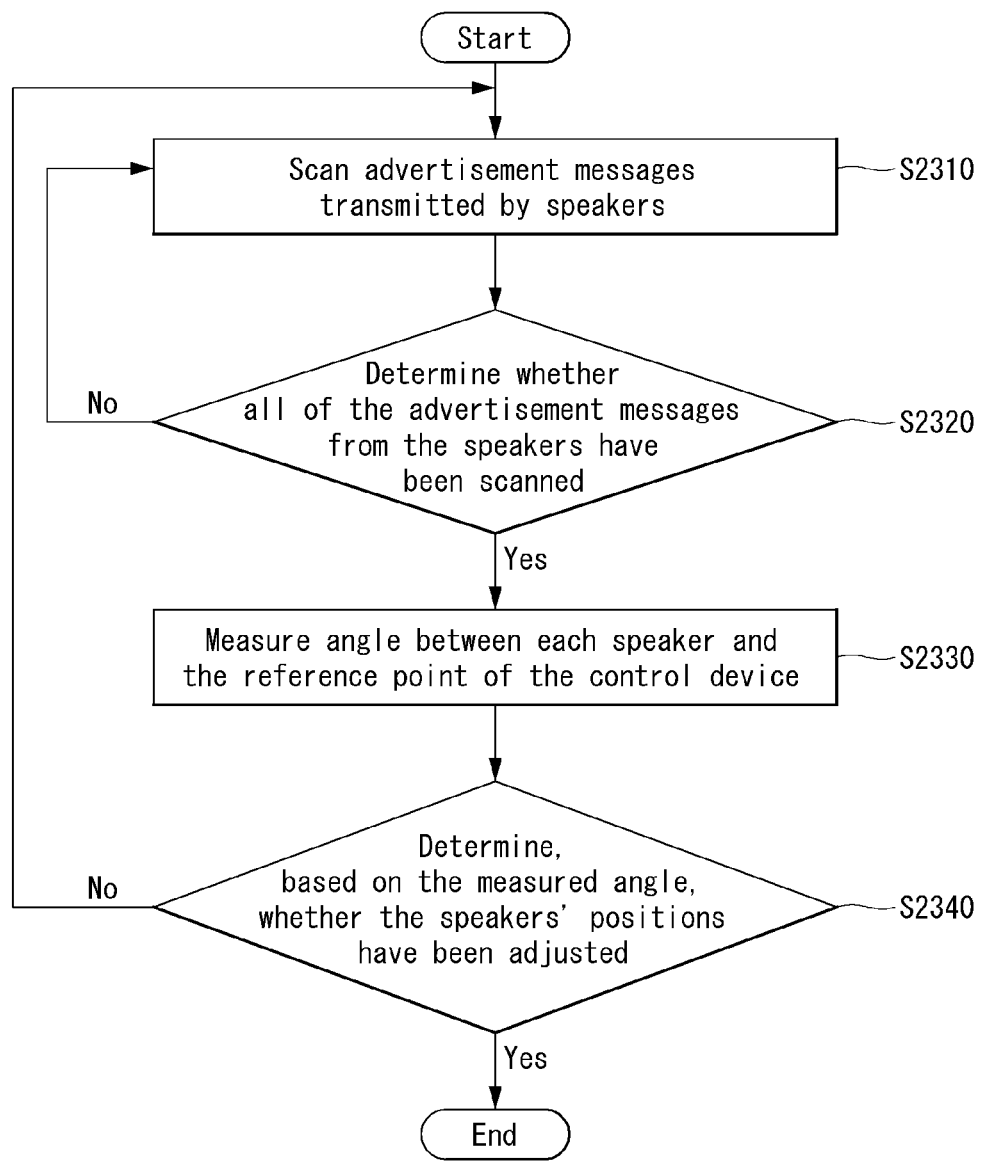

[FIG. 24]
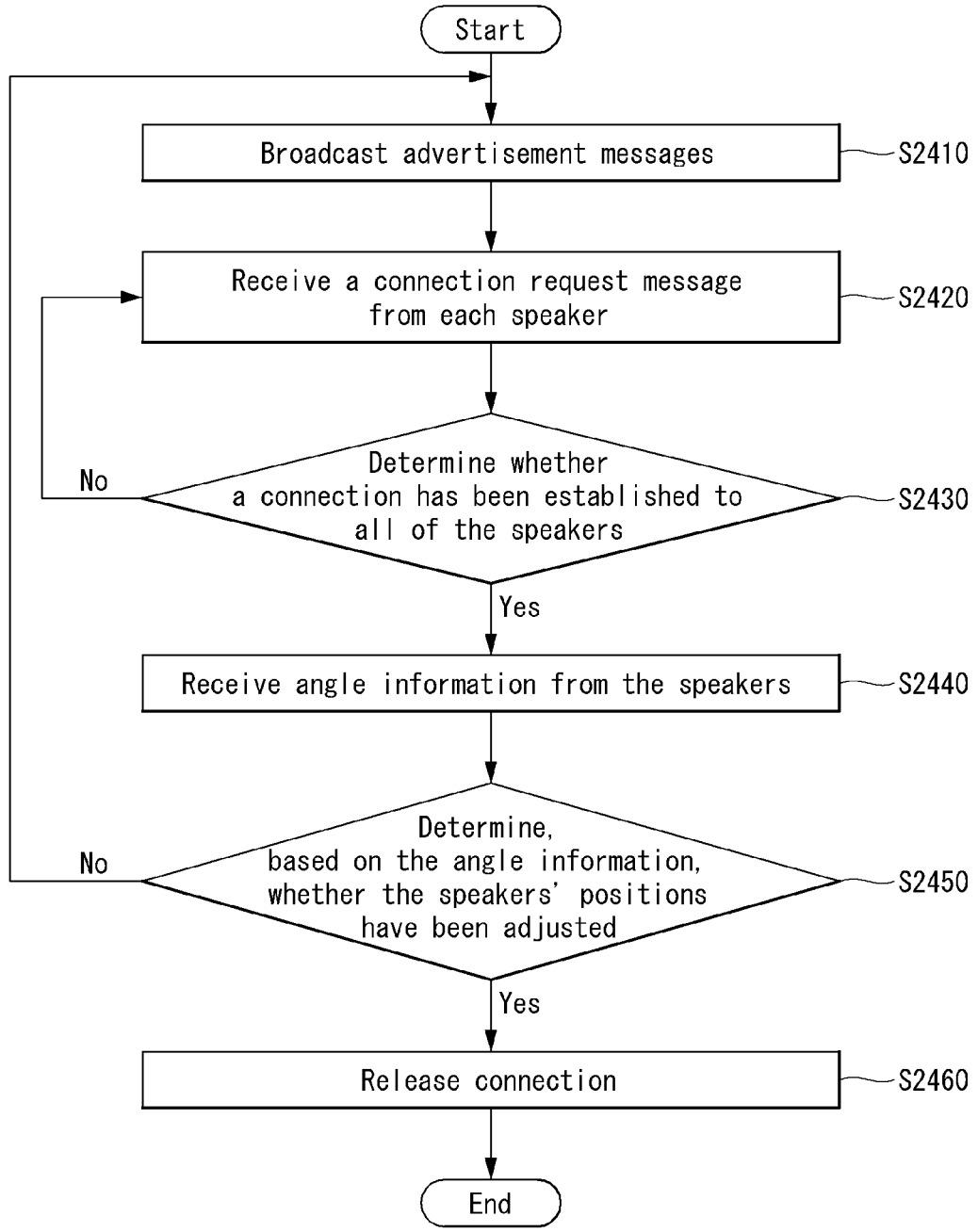

[FIG. 25]
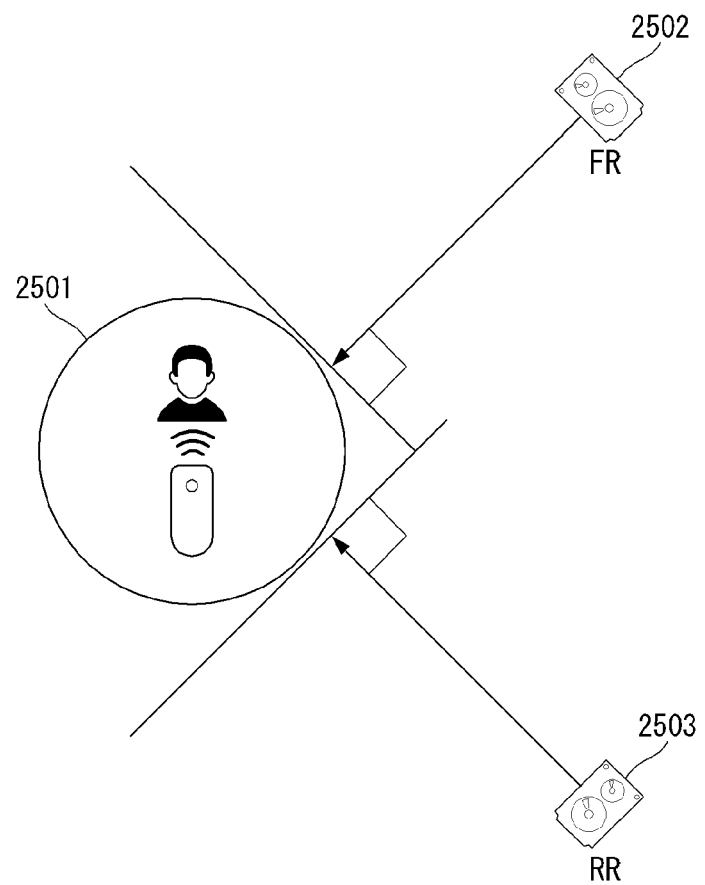

[FIG. 26]
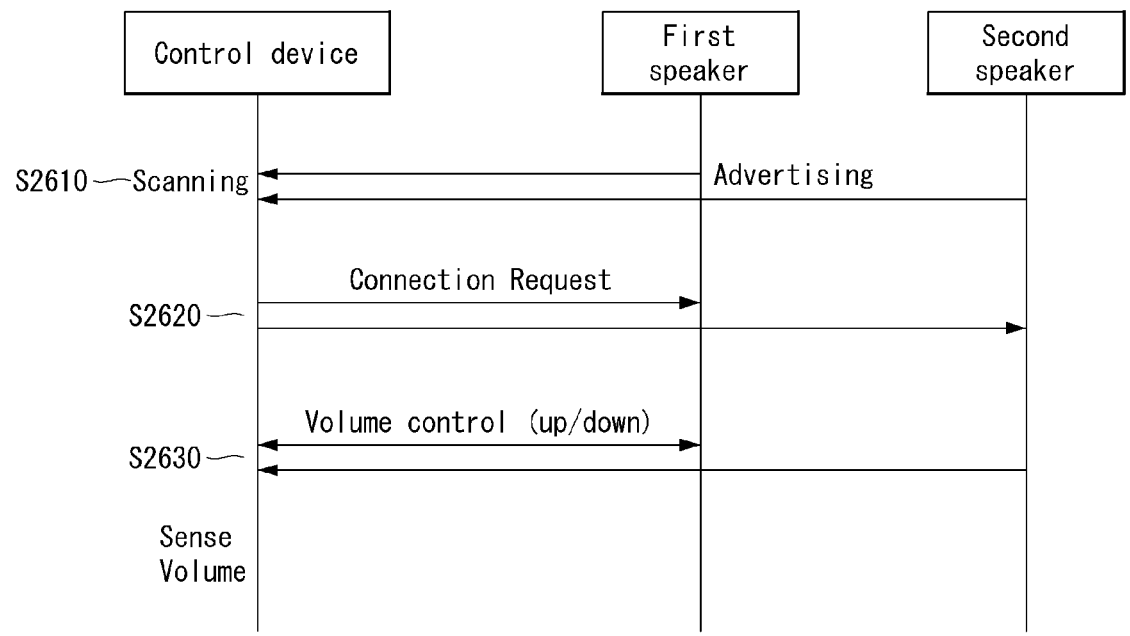

[FIG. 27]
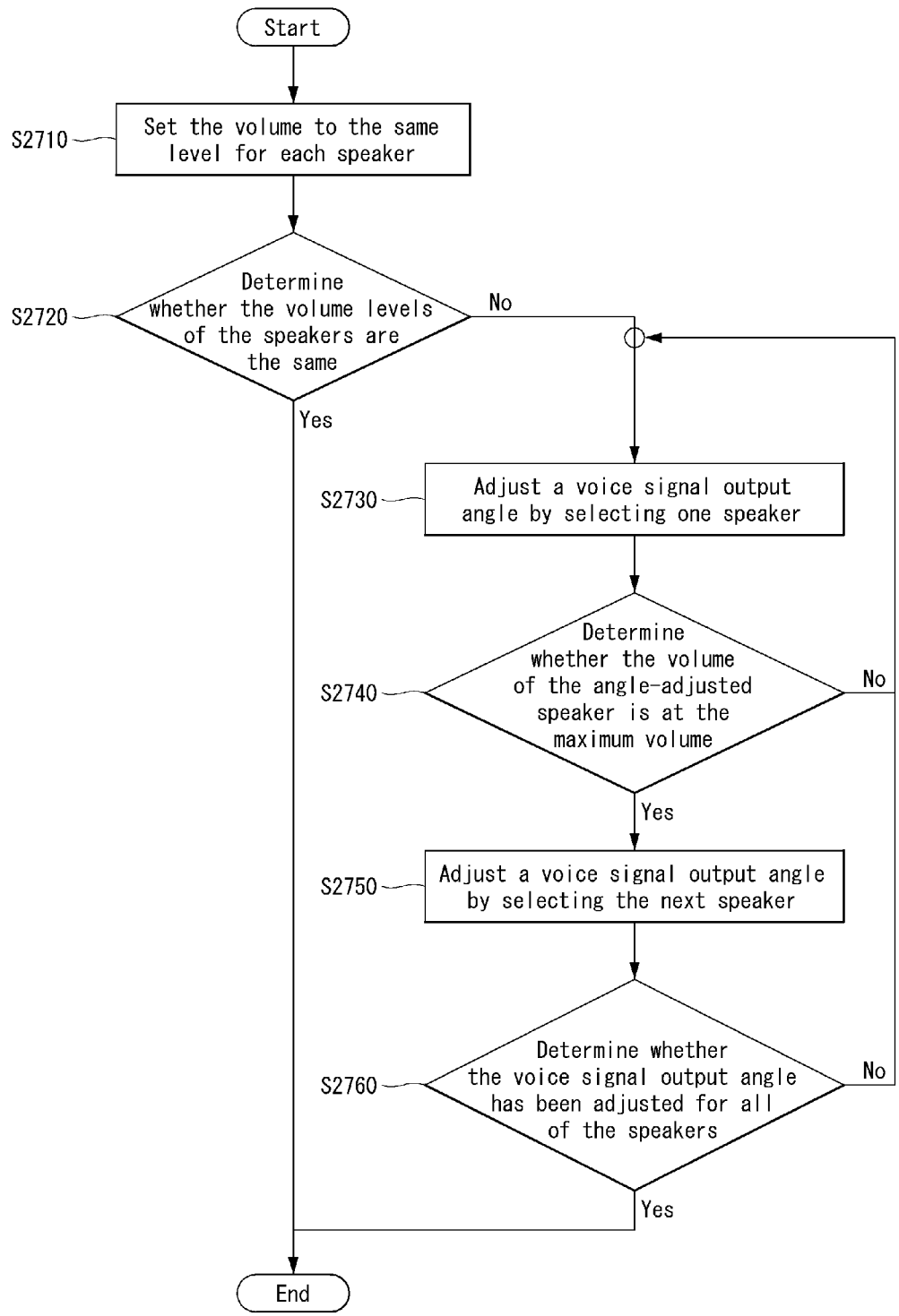

[FIG. 28]
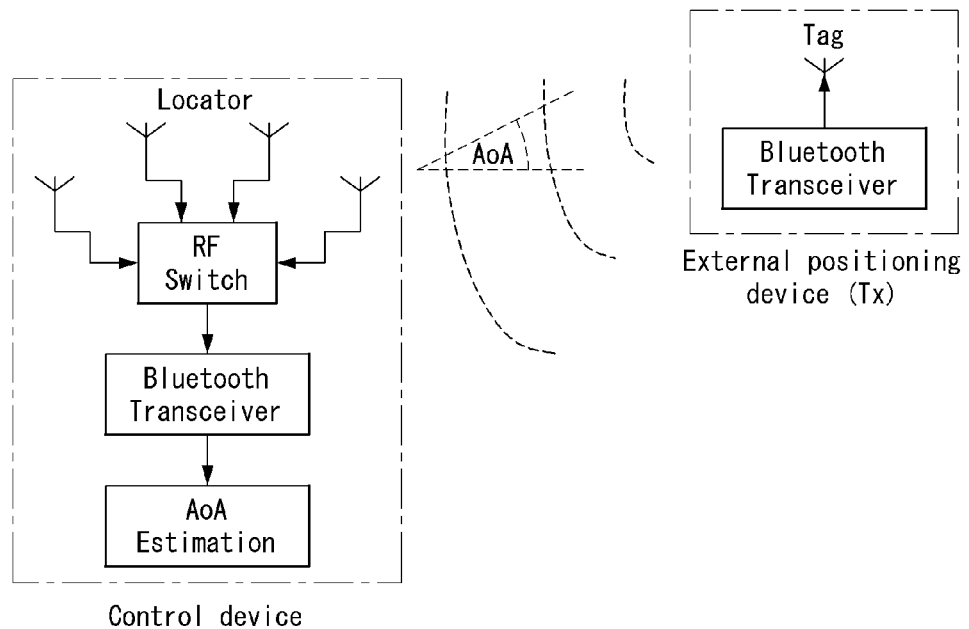
(a)
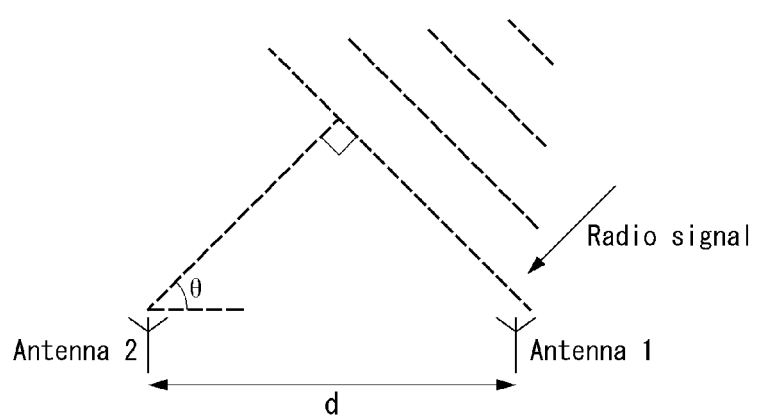
(b)

[FIG. 29]
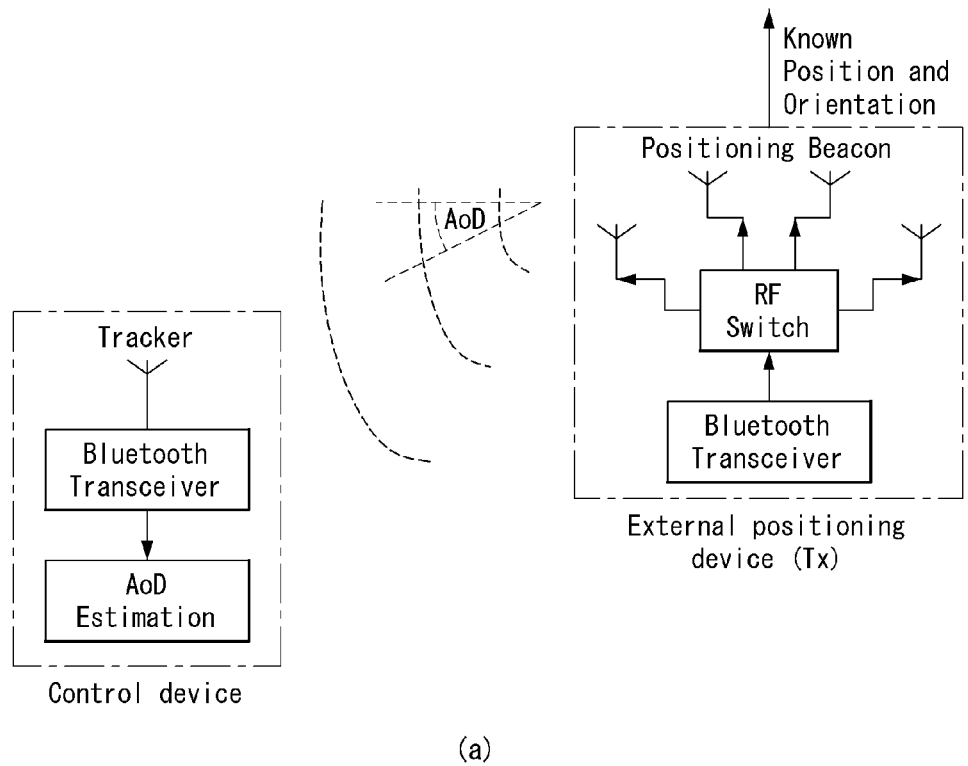
(a)
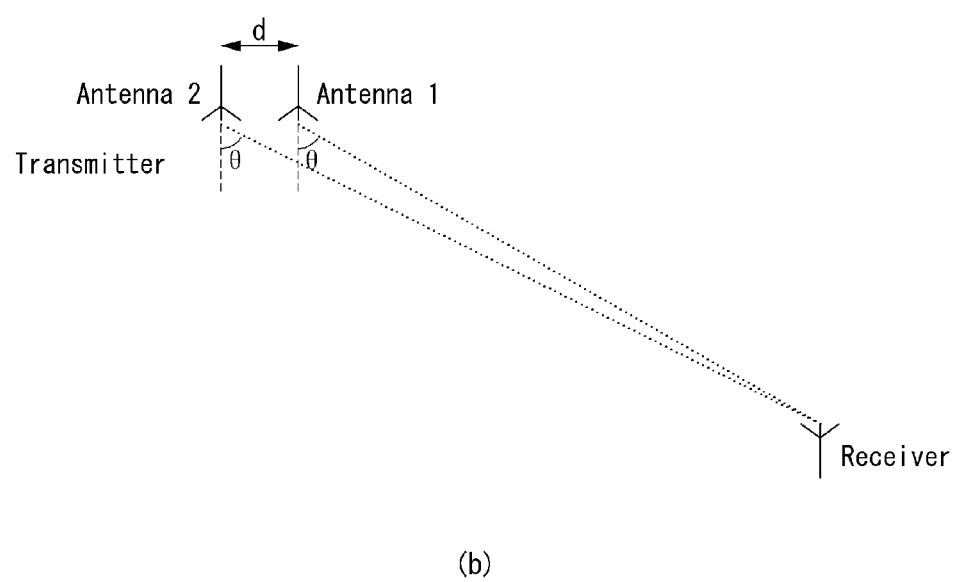
(b)

[FIG. 30]
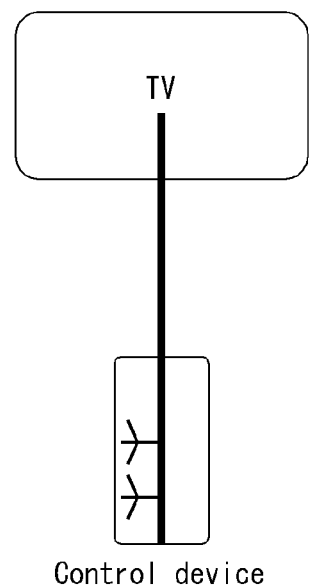
Control device
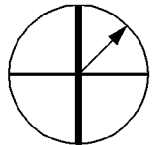
Angle between the
reference point
and the speaker
(−110 degrees)
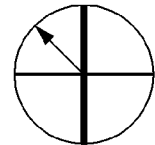
Angle between the
reference point
and the speaker
(110 degrees)

[FIG. 31]
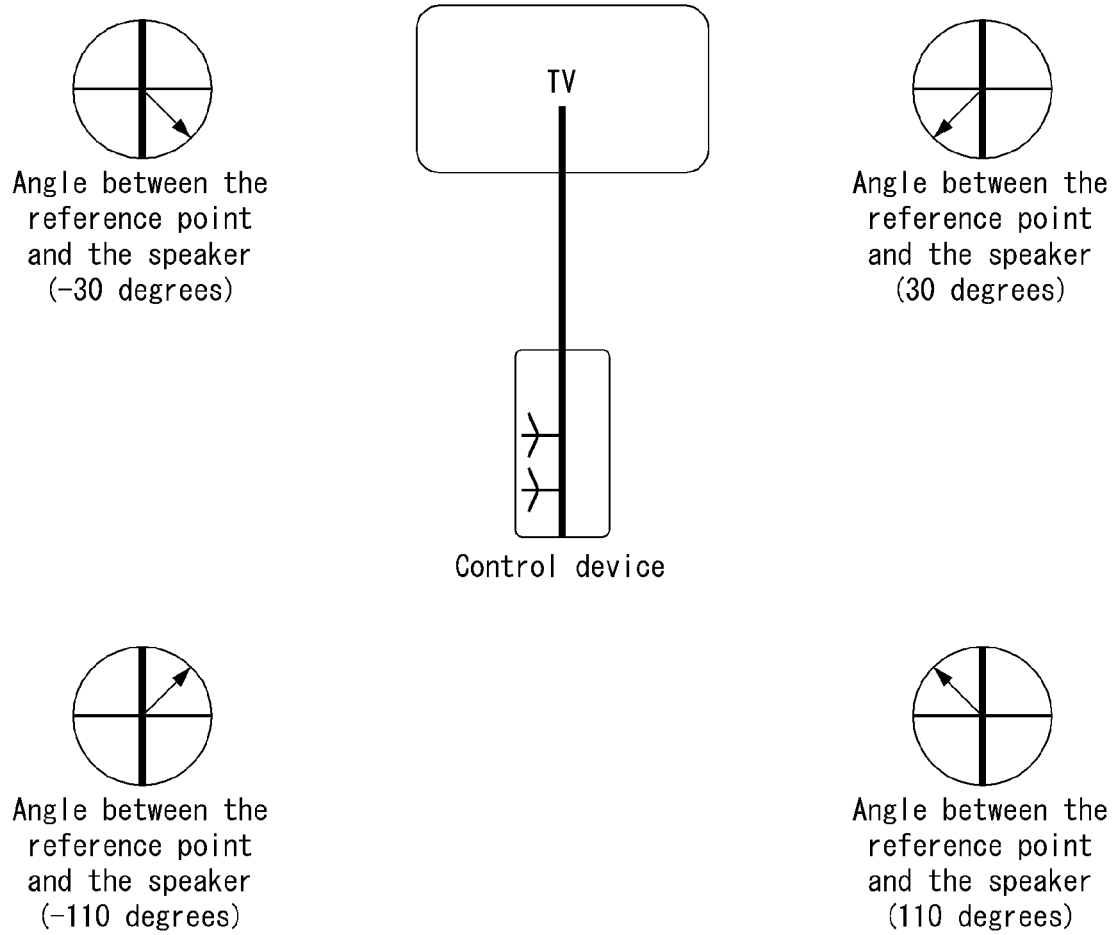

[FIG. 32]
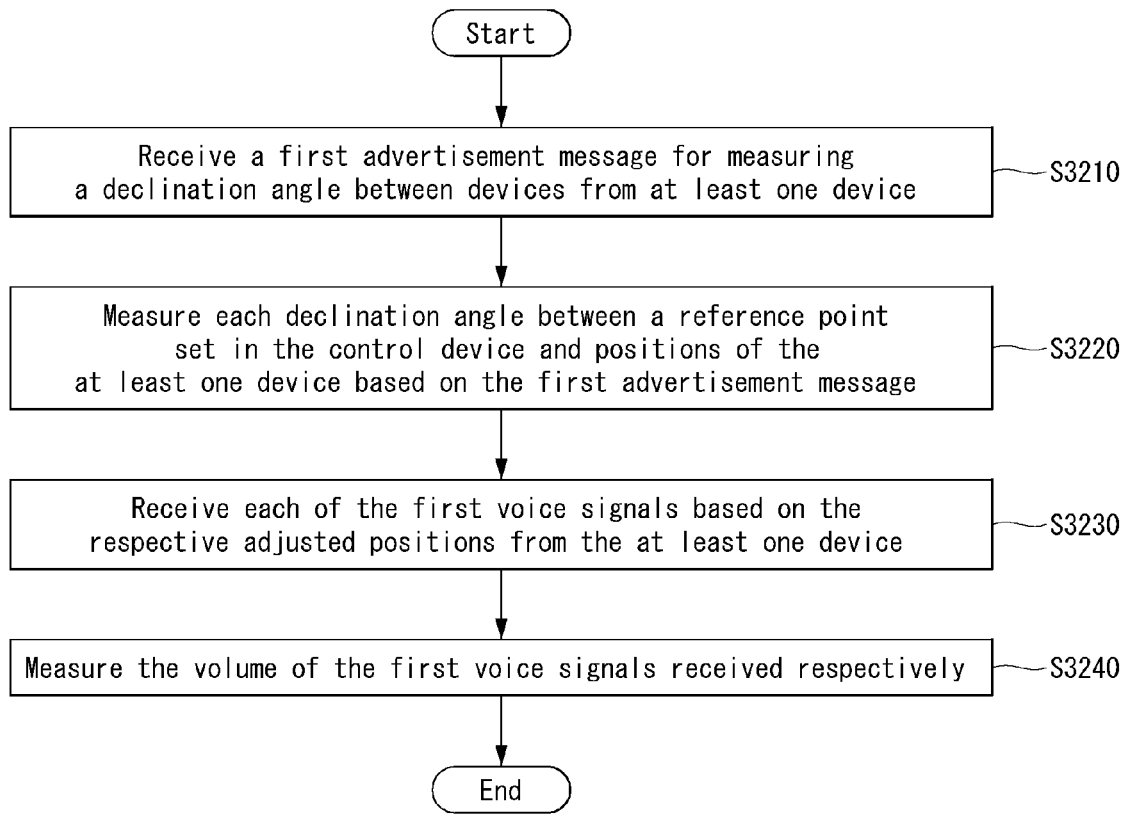

VOICE SIGNAL RECEIVING METHOD USING BLUETOOTH LOW POWER IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2020/006188, filed on May 11, 2020, which claims the benefit of earlier filing date and right of priority to Korean Application No. 10-2019-0055284, filed on May 10, 2019, the contents of which is hereby incorporated by reference herein in its entirety.

TECHNICAL FIELD

The present disclosure relates to a wireless communication system and more particularly, a voice signal receiving method using Bluetooth low power and an apparatus for the method.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

An object of the present disclosure is to provide a method and an apparatus for receiving a voice signal using Bluetooth low energy in a wireless communication system.

Also, an object of the present disclosure is to provide a method and an apparatus for a control device to adjust the position of at least one device to receive a voice signal in a wireless communication system.

Also, an object of the present disclosure is to provide a method and an apparatus for a control device to adjust an angle between the positions of the control device and at least one device to receive a voice signal in a wireless communication system.

Also, an object of the present disclosure is to provide a method and an apparatus for a control device to adjust a voice signal output angle at which at least one device outputs a voice signal to receive the voice signal in a wireless communication system.

Objects of the present disclosure are not limited to the above-mentioned objects. That is, other objects that are not mentioned may be obviously understood by those skilled in the art to which the present disclosure pertains from the following description.

Technical Solution

The present disclosure provides a method for a control device to receive a voice signal from at least one device in a short-range wireless communication system and apparatus therefor.

Specifically, in the present disclosure, a method for a control device to receive a voice signal from at least one device in a short-range wireless communication system, the method comprising: receiving a first advertisement message for measuring a declination angle between devices from the at least one device, respectively; measuring each declination angle between a reference point set in the control device and positions of the at least one device based on the first advertisement message, wherein the positions of the at least one device are respectively adjusted such that each declination angle satisfies a specific angle for receiving a voice signal, based on the measured respective declination angles; receiving each of a first voice signals based on the respective adjusted positions from the at least one device; and measuring a volume of the received first voice signal, respectively, wherein based on the measured volume, an audio signal output angle of the at least one device is adjusted such that an audio signal received by the control device is incident at right angles to the control device, respectively.

Furthermore, in the present disclosure, further comprising: receiving a second voice signal, from the at least one device, based on (i) the respectively adjusted positions and (ii) the respectively adjusted voice signal output angle of the at least one device.

Furthermore, in the present disclosure, further comprising: receiving, respectively from the at least one device, a second advertisement message for establishing a connection for measuring the volume of the first voice signal; transmitting a connection request message to the at least one device based on the second advertisement message, respectively; and receiving, respectively from the at least one device, a connection response message in response to the connection request message.

Furthermore, in the present disclosure, wherein the first advertisement message includes a data field for the control device to measure the respective first declination angle, and wherein the data field is a constant tone extension (CTE) field.

Furthermore, in the present disclosure, wherein the CTE field is a sequence of bits in which '0' and '1' are repeated.

Furthermore, in the present disclosure, wherein the second advertisement message does not include the CTE field.

Furthermore, in the present disclosure, wherein each of the declination angles is calculated based on a distance between a plurality of antennas included in the control device, a wavelength of the first advertisement message transmitted by the at least one device, and a phase difference between the first advertisement messages respectively received at a side of the plurality of antenna.

Furthermore, in the present disclosure, further comprising: broadcasting, to the at least one device, a second advertisement message for measuring an angle between devices through the plurality of antennas; receiving a connection request message from the at least one device, respectively; transmitting, to the at least one device, a connection response message in response to the connection request message, respectively; and receiving, respectively from the at least one device, each of the declination information, wherein each of the declination information includes information on a specific declination angle between the reference point set in the control device and a location of a specific device among the at least one device, and wherein the specific declination angle is measured based on the second advertisement message.

Furthermore, in the present disclosure, wherein the specific declination is calculated based on the distance between the plurality of antennas, the wavelength of the second advertisement message each broadcast through the plurality of antennas, and a phase difference at a receiving end of the specific device between the second advertisement messages, respectively broadcast through the plurality of antennas.

Furthermore, in the present disclosure, wherein the positions of the at least one device is adjusted further based on the declination information each received from the at least one device.

Furthermore, in the present disclosure, a control device for receiving a voice signal from at least one device in a short-range wireless communication system, the control device comprising: a transmitter for transmitting a radio signal; a receiver for receiving a radio signal; and a processor operatively connected to the transmitter and the receiver; wherein the processor is configured to control: the receiver to receive a first advertisement message for measuring a declination angle between devices from the at least one device, respectively; to measure each declination angle between a reference point set in the control device and positions of the at least one device based on the first advertisement message, wherein the positions of the at least one device are respectively adjusted such that each declination angle satisfies a specific angle for receiving a voice signal, based on the measured respective declination angles; the receiver to receive each of a first voice signals based on the respective adjusted positions from the at least one device; and to measure a volume of the received first voice signal, respectively, wherein based on the measured volume, an audio signal output angle of the at least one device is adjusted such that an audio signal received by the control device is incident at right angles to the control device, respectively.

Furthermore, in the present disclosure, wherein the processor is further configured to control: the receiver to receive a second voice signal, from the at least one device, based on (i) the respectively adjusted positions and (ii) the respectively adjusted voice signal output angle of the at least one device.

Furthermore, in the present disclosure, wherein the processor is further configured to control: the receiver to receive, respectively from the at least one device, a second advertisement message for establishing a connection for measuring the volume of the first voice signal; the transmitter to transmit a connection request message to the at least one device based on the second advertisement message, respectively; and the receiver to receive, respectively from the at least one device, a connection response message in response to the connection request message.

Furthermore, in the present disclosure, wherein the first advertisement message includes a data field for the control device to measure the respective first declination angle, and wherein the data field is a constant tone extension (CTE) field.

Furthermore, in the present disclosure, wherein the CTE field is a sequence of bits in which '0' and '1' are repeated.

Advantageous Effects

The present disclosure provides an effect of receiving a voice signal using Bluetooth low power in a wireless communication system.

Also, the present disclosure provides an effect that a control device may adjust the position of at least one device to receive a voice signal in a wireless communication system.

Also, the present disclosure provides an effect that a control device may adjust the angle between the control device and at least one device to receive a voice signal in a wireless communication system.

Also, the present disclosure provides an effect that a control device may adjust a voice signal output angle at which at least one device outputs a voice signal to receive the voice signal.

The technical effects of the present disclosure are not limited to the technical effects described above, and other technical effects not mentioned herein may be understood to those skilled in the art to which the present disclosure belongs from the description below.

DESCRIPTION OF DRAWINGS

The accompanying drawings, which are included as part of the detailed description to help the understanding of the present invention, provide embodiments of the present invention, and together with the detailed description, describe the technical features of the present invention.

FIG. 1 is a schematic view illustrating an example of a wireless communication system using a Bluetooth low energy technology to which the present disclosure is applicable.

FIG. 2 illustrates an example of an internal block diagram of a device capable of implementing methods proposed by the present disclosure.

FIG. 3 illustrates an example of a Bluetooth communication architecture to which methods proposed by the present disclosure may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present disclosure may be applied.

FIG. 6 illustrates an example of a 5.1 channel surround sound system comprising a TV and speakers.

FIG. 7 illustrates an example of a 5.1 channel surround sound system comprising a TV and speakers.

FIG. 8 illustrates an example of an operation performed between a TV and speakers for providing surround sounds to a user in a 5.1 channel surround sound system.

FIG. 9 is a flow diagram illustrating an example of an operation performed between two speakers and a TV with built-in speakers in a 5.1 channel surround sound system.

FIG. 10 is a flow diagram illustrating an example of an operation performed between two speakers and a TV with built-in speakers in a 5.1 channel surround sound system.

FIG. 11 illustrates examples of a data packet format transmitted through a BIS channel.

FIG. 12 shows an example of an operation performed between two speakers and a TV with built-in speakers for providing surround sounds to a user in a 5.1-channel surround sound system.

FIG. 13 is a flow diagram illustrating an example of an operation performed between three speakers and a TV with built-in speakers in a 5.1 channel surround sound system.

FIG. 14 is an example of an operation performed between three speakers and a TV with built-in speakers for providing surround sounds to a user in a 5.1 channel surround sound system.

FIG. 15 is a flow diagram illustrating an example of an operation performed between five speakers and a TV with built-in speakers in a 5.1 channel surround sound system.

FIG. 16 is a flow diagram illustrating an example of an operation performed between six speakers and a TV without a built-in speaker in a 5.1 channel surround sound system.

FIG. 17 illustrates examples of speaker arrangements in a 5.1 channel surround sound system.

FIG. 18 illustrates examples of sweet spots according to the number of speakers.

FIG. 19 illustrates examples of methods for configuring a reference point in a control device to measure speakers' positions (angles).

FIG. 20 is a flow diagram illustrating examples of operations for measuring an angle between a control device and a speaker performed by the control device to adjust the speaker's position.

FIG. 21 is a flow diagram illustrating an example in which a method for configuring 5.1 surround channels according to the present disclosure is performed.

FIG. 22 illustrates an example of a packet format of an advertisement message used for a control device to measure a speaker's position.

FIG. 23 is a flow diagram illustrating an example in which a control device performs a method for configuring speakers' positions according to the present disclosure.

FIG. 24 is a flow diagram illustrating another example in which a control device performs a method for configuring speakers' positions according to the present disclosure.

FIG. 25 illustrates an example of configuring speakers' audio sound output angles.

FIG. 26 is a flow diagram illustrating an example in which a method for adjusting speakers' audio sound output angles according to the present disclosure is performed between a control device and the speakers.

FIG. 27 is a flow diagram illustrating an example in which a control device performs a method for adjusting speakers' audio sound output angles according to the present disclosure.

FIG. 28 illustrates an example in which a control device measures AoA.

FIG. 29 illustrates an example in which a control device measures AoD.

FIG. 30 illustrates an example in which a control device performs a method for measuring speakers' positions and adjusting the speakers' voice signal output angles according to the present disclosure.

FIG. 31 illustrates another example in which a control device performs a method for measuring speakers' positions and adjusting the speakers' voice signal output angles according to the present disclosure.

FIG. 32 is a flow diagram illustrating an example in which a control device performs a method for receiving a voice signal from at least one device according to the present disclosure.

MODE FOR DISCLOSURE

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the specification. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present application, a term such as "comprising" or "including" should not be interpreted as necessarily including all various components or various steps disclosed in the specification, and it should be interpreted that some component or some steps among them may not be included or additional components or steps may be further included. Suffixes "unit", "module", and "section" for components used in the following description are given or mixed in consideration of easy preparation of the specification only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by the present disclosure.

As shown in FIG. 2, the server device 110 includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present disclosure.

Furthermore, the client device 120 includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present disclosure.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device 110 or the client device 120, and controls the server device or the client device in order in order to request the transmission of a message through the Bluetooth interface or other interface and to process a received message.

The processors 114 and 124 may be represented by a control section, a control unit, a controller, and the like.

The processors 114 and 124 may include an application-specific integrated circuit (ASIC), another chipset, a logic circuit, and/or a data processing device.

The processors 114 and 124 control the communication unit to receive an Advertisement message from the server device 110, transmit a Scan Request message to the server device 110, control the communication unit to receive a Scan Response message from the server device 110 in response to the scan request, and control the communication unit to transmit a Connect Request message to the server device 110 in order to establish a Bluetooth connection with the server device 110.

In addition, after a Bluetooth LE connection is established through the connection procedure, the processors 114 and 124 control the communication unit so as to read or write data from or in the server device 110 using an attribute protocol.

The memory units 115 and 125 may include a read-only memory (ROM), a random access memory (RAM), a flash memory, a memory card, a storage medium, and/or other storage devices.

The communication units 118 and 127 may include a baseband circuit for processing a radio signal. When the embodiment is implemented by software, the aforementioned technique may be implemented by a module (a process, a function, and the like) that performs the aforementioned function. The module may be stored in the memory unit and executed by the processor.

The memory units 115 and 125 may be positioned inside or outside the processors 114 and 124 and connected with the processors 114 and 124 by various well-known means.

The display units 111 and 121 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by the present disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth specification using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4

GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i.e., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| PDU Type | PDU Name | Channel | Permitted PHYs | | |
|---|---|---|---|---|---|
| | | | LE 1M | LE 2M | LE Coded |
| 0000b | ADV_IND | Primary Advertising | • | | |
| 0001b | ADV_DIRECT_IND | Primary Advertising | • | | |
| 0010b | ADV_NONCONN_IND | Primary Advertising | • | | |
| 0011b | SCAN_REQ | Primary Advertising | • | | |
| | AUX_SCAN_REQ | Secondary Advertising | • | • | • |
| 0100b | SCAN_RSP | Primary Advertising | • | | |
| 0101b | CONNECT_IND | Primary Advertising | • | | |
| | AUX_CONNECT_REQ | Secondary Advertising | • | • | • |
| 0110b | ADV_SCAN_IND | Primary Advertising | • | | |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute

Type: Type of attribute

Value: Value of attribute

Permission: Access authority to attribute

FIG. 5 is a flowchart showing an example of a connection procedure method in Bluetooth low power energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK

Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

A 5.1-channel surround sound system refers to a six-channel surround sound audio system using six speakers. The 5.1-channel surround sound system uses five full-band channels and one low-frequency effect channel.

Recently, contents supported through a 5.1-channel surround sound system (for example, Bluray discs or streaming contents such as Netflix) are increasing. However, to use the 5.1-channel surround sound system, a user has to install six speakers directly, making it difficult to utilize the 5.1-channel surround sound system actively.

More specifically, a user does not always have to configure the 5.1-channel surround sound system but only needs to configure the 5.1-channel surround sound system when watching contents. Therefore, when a user, who has not configured the 5.1-channel surround sound system, attempts to configure the 5.1-channel surround sound system to use the 5.1-channel surround sound system, the user has to arrange six speakers to specific positions for normal operation of the 5.1 channel surround sound system. In other words, among the six 5.1-channel surround speakers, guidelines for specific positions of the speakers on the user's left and right sides are as follows.

Front left (FL) speaker: The angle between a TV, a listener, and the speaker should satisfy 30 degrees.

Front right (FR) speaker: The angle between the TV, the listener, and the speaker should satisfy 30 degrees.

Rear left (RL) speaker: The angle between the TV, the listener, and the speaker should satisfy 110 degrees.

Rear right (RR) speaker: The angle between the TV, the listener, and the speaker should satisfy 110 degrees.

Also, besides the condition that the TV, the listener's position, and the speakers should satisfy specific angles, the incidence angle at which the speakers' sounds reach the user should be perpendicular to the user.

Due to the problem above, the user often uses a soundbar or only two speakers instead of configuring the 5.1-channel surround sound system. Accordingly, the user has inevitably to listen to the contents at a lower sound quality than when watching the contents through the 5.1-channel surround sound system.

To solve the problem above, the present disclosure provides a method for configuring a 5.1 channel surround sound system through a portable Bluetooth speaker that a user may conveniently use. In other words, the user may configure the 5.1 channel surround sound system by adjusting the positions of speakers constituting the 5.1-channel surround sound system through a control device.

More specifically, the present disclosure provides a method (method 1) for installing a speaker at a correct position (angle) using the Bluetooth Direction Finding technology.

Also, the present disclosure uses Bluetooth Low Energy Audio Volume control and Mic Sensing techniques to provide a method (method 2) for adjusting the output angle of sounds from a speaker to make the sounds incident at a right angle to the user. The audio sound may be a sound that a user may audibly perceive.

Through the method provided in the present disclosure, a user obtains an advantageous effect that the user may correctly install speakers at the specific positions for driving a 5.1 channel surround sound system compared to the case where the user manually installs the speakers.

In what follows, for the convenience of description, the positions of speakers for properly driving a 5.1-channel surround sound system may be referred to as "sweet spots." Also, a device used by a user to adjust the positions of the speakers constituting the 5.1-channel surround sound system may be referred to as a "control device," and the (portable) speakers constituting the 5.1-channel surround sound system may be referred to as "peripheral devices" or "devices."

Also, in what follows, for the convenience of description, the audio sound output from a speaker may be referred to as a "voice signal."

In addition to the expression defined above, the terms defined for the description may be expressed in various other ways without departing from the scope of the terms being interpreted in the same context.

Before setting out to explain the methods of the present disclosure, the 5.1 channel surround sound system will be described first.

FIG. 6 illustrates an example of a 5.1 channel surround sound system comprising a TV and speakers.

Referring to FIG. 6, a block diagram of a TV 610 and speakers 620 and a block diagram 621 of the speakers are shown.

First, the TV 610 includes a video display, an audio decoder and encoder, a controller, and a BLE transmission (Tx) interface. The video display and the audio decoder and encoder are functionally connected to the controller. The audio decoder of the TV 610 receives an audio stream and performs pulse-code modulation (PCM) data decoding for each of the six channels. The audio stream may be a Dolby 5.1 channel stream or a DTS 5.1 channel stream.

PCM streams decoded through PCM data decoding are encoded through LC3, the Bluetooth LE audio codec. The six encoded streams are transmitted to the BLE transmission interface of the TV 610, and the BLE transmission interface may transmit the received six streams to the BLE reception (Rx) interface of the speaker 620.

Next, the six speakers 620 of FIG. 6 constitute a 5.1-channel surround sound system, and the six speakers 620 may include FL, FR, C, RL, RR, and W speakers. The meanings of the abbreviations such as FL and FR are given below.

FL (Front Left): Left
FR (Front Right): Right
C (Center): Center
RL (Rear Left): Left Surround
RR (Rear Right): Right Surround
W (Woofer): Low Frequency Effect The block diagram 621 of the speaker may be commonly applied to all of the six speakers. The block diagram 621 of the speaker may include a BLE transmission/reception (Tx/Rx) interface, an audio decoder, a speaker driver, and a controller. The BLE transmission/reception interface may be functionally connected to the controller.

FIG. 6 illustrates a case using six speakers. However, if the TV has built-in speakers, the 5.1-channel surround sound system may comprise fewer speakers.

For example, when there are two speakers, depending on the user's selection, the two speakers may be used as a rear left and rear right speakers, and the speakers embedded in the TV may be used as front left and front right speakers.

As another example, when there are three speakers, depending on the user's selection, the three speakers may be used as a rear left, rear right, and woofer speakers, and the speaker embedded in the TV may be used as a front left and front right speakers.

As yet another example, if there are five speakers, depending on the user's selection, the five speakers may be used as a rear left, rear right, woofer, front left, and front right speakers, and the speaker embedded in the TV may not be used or used as a center speaker.

As shown in FIG. 6, when there are six speakers, depending on the user's selection, the six speakers are used as a rear left, rear right, woofer, front left, front right, and center speakers, and the speaker embedded in the TV is may not be used.

Also, external speakers may still be used as a left, right, and woofer speakers for the case of a 2 or 2.1 channel sound system rather than the surround sound system.

FIG. 7 illustrates an example of a 5.1 channel surround sound system comprising a TV and speakers, and FIG. 8 illustrates an example of an operation performed between a TV and speakers for providing surround sounds to a user in a 5.1 channel surround sound system.

Referring to FIG. 7, a block diagram 710 of a TV and a block diagram 720 of a speaker are shown.

First, the block diagram 710 of the TV may include an audio decoder and encoder 711 and a BLE transmission (TX) interface 712.

The block diagram of the speaker may include a BLE transmission/reception (Tx/Rx) interface 722, an audio decoder 721, and a speaker driver 723.

Referring to FIG. 8(a), the audio decoder 711-1 of the TV receives an audio stream and performs pulse-code modulation (PCM) data decoding for each of the six channels. The audio stream may be a Dolby 5.1 channel stream or a DTS 5.1 channel stream. The audio decoder 711-1 may be a Dolby 5.1 channel decoder.

PCM streams decoded through PCM data decoding are encoded through the encoder 711-2 of the TV. The encoder 711-2 of the TV may be an LC3 encoder. The encoded six streams are delivered to the BLE transmission interface 712 of the TV. The BLE transmission interface 712 may group the received six streams (Connected Isochronous Stream (CIS)) into one stream group (Connected Isochronous Group (CIG)) and transmit the grouped six streams to the BLE reception (Rx) interface 722 of each of the six speakers.

Here, the CIS corresponds to a BLE audio channel between the TV (initiator) and the speaker (acceptor). The CIG corresponds to an audio stream group that groups CISs with the same timing reference.

Referring to FIG. 8(b), the BLE Rx interface 722 of each speaker receives one CIS. Next, the BLE Rx interface 722 transmits the received CIS to the decoder 721 of the speaker, and the decoder 721 decodes the CIS and delivers the decoded CIS to the speaker driver 723 of the speaker. The decoder 721 may be an LC3 decoder. The speaker driver 723 outputs the transmitted audio sound of the decoded CIS.

FIG. 9 is a flow diagram illustrating an example of an operation performed between two speakers and a TV with built-in speakers in a 5.1 channel surround sound system.

In FIG. 9, the TV 901 has a built-in FL and FR speakers, and a C speaker may be optionally installed therein. The TV 901 may operate as an initiator, and the speakers may operate as acceptors.

S910: The first speaker 902 and the second speaker 903 transmit advertisement messages using a general announcement (GA) method or a target announcement (TA) method. Here, the GA may refer to an operation method for broadcasting an advertisement message including simple information indicating that a device is ready to receive or provide a specific service. Also, the TA may refer to an operation method for transmitting an advertisement message including information on the role (RR or RL) of a device and decoder performance by setting an address for a specific central device to receive the advertisement message. The TV 901 receives the advertisement message transmitted to the GA or TA from the first speaker 902 and the second speaker 903. Afterward, the TV 901 may set the TV's built-in speakers as the FL, FR, or C speaker in the 5.1-channel surround sound system. The TV 901 may determine the positions of the first speaker 902 and the second speaker 903 based on the advertisement message transmitted through the TA method.

S920: The TV 901 transmits a connection request message to the first speaker 902 and the second speaker 903. After that, the TV 901 may set its role to operate as a central device. When receiving an advertisement message through the TA method in the S910 step, the TV 901 may set the first speaker 902 as a peripheral (RR) based on the advertisement message. Likewise, the TV 901 may set the second speaker 903 as a peripheral (RL) based on the advertisement message. Alternatively, the TV 901 may determine the positions of the first speaker 902 and the second speaker 903 through a published audio capability (PAC) discovery procedure in the connection step with the first speaker 902 and the second speaker 903. The TV 901 may set the role of the first speaker 902 as the peripheral (RR) and the second speaker 903 as the peripheral (RL) based on the determined positions. The S920 step may be performed in the GATT layer.

S930: The TV 901 transmits a message requesting to form a CIS channel to the first speaker 902 and the second speaker 903 respectively to form a CIS channel between the first speaker 902 and the second speaker 903. The CIS channel may be a unicast channel. Here, the TV 901 may correspond to a master device, and the first speaker 902 and the second speaker 903 may correspond to a slave device. Afterward, a first CIS channel may be formed between the TV 901 and the first speaker 902, and a second CIS channel may be formed between the TV 901 and the second speaker 903. And the first CIS channel and the second CIS channel may be grouped into one CIG. The TV 901 may transmit the audio stream of the contents being watched by the user to each of the first speaker 902 and the second speaker 903 through the formed first and second CIS channels using the unicast scheme. The S930 step may be performed in the link layer.

FIG. 10 is a flow diagram illustrating an example of an operation performed between two speakers and a TV with built-in speakers in a 5.1 channel surround sound system.

In FIG. 10, the TV 1001 has a built-in FL and FR speakers, and a C speaker may be optionally installed therein. The TV 1001 may operate as an initiator, and the speakers may operate as acceptors.

S1010: The first speaker 1002 and the second speaker 1003 transmit advertisement messages using a general announcement (GA) method or a target announcement (TA) method. Here, the GA may refer to an operation method for broadcasting an advertisement message including simple information indicating that a device is ready to receive or provide a specific service. Also, the TA may refer to an operation method for transmitting an advertisement message including information on the role (RR or RL) of a device and decoder performance by setting an address for a specific central device to receive the advertisement message. The TV 1001 receives the advertisement message transmitted to the GA or TA from the first speaker 1002 and the second speaker 1003. Afterward, the TV 1001 may set the TV's built-in speakers as the FL, FR, or C speaker in the 5.1-channel surround sound system. The TV 1001 may determine the positions of the first speaker 1002 and the second speaker 1003 based on the advertisement message transmitted through the TA method.

S1020: The TV 1001 transmits a connection request message to the first speaker 1002 and the second speaker 1003. After that, the TV 1001 may set its role to operate as a central device. When receiving an advertisement message through the TA method in the S1010 step, the TV 1001 may set the first speaker 1002 as a peripheral (RR) based on the advertisement message. Likewise, the TV 1001 may set the second speaker 1003 as a peripheral (RL) based on the advertisement message. Alternatively, the TV 1001 may determine the positions of the first speaker 1002 and the second speaker 1003 through a published audio capability (PAC) discovery procedure in the connection step with the first speaker 1002 and the second speaker 1003. The TV 1001 may set the role of the first speaker 1002 as the peripheral (RR) and the second speaker 1003 as the peripheral (RL) based on the determined position. The S1020 step may be performed in the GATT layer.

S1030: The TV 1001 forms a BIS channel between the first speaker 1002 and the second speaker 1003. The CIS channel may be a broadcast channel. Here, the TV 1001 may correspond to a master device, and the first speaker 1002 and the second speaker 1003 may correspond to a slave device. The TV 901 may broadcast the audio stream of the contents being watched by the user to the first speaker 1002 and the second speaker 1003 through the formed BIS channel. The S1030 step may be performed in the link layer.

FIG. 11 illustrates examples of a data packet format transmitted through a BIS channel.

FIG. 11(*a*) illustrates an example in which a data packet is configured to include two BIS streams in one BIG.

In FIG. 11(*a*), when an RR BIS event occurs, a BIS stream is transmitted, which includes an indicator (RR) indicating that the BIS stream is a data packet for the RR speaker, a time stamp, and a sequence number (seq #) in the header and includes an RR channel audio data packet in the payload. When an RL BIS event occurs after some time has passed, a BIS stream is transmitted, which includes an indicator (RL) indicating that the BIS stream is a data packet for the RL speaker, a time stamp, and a sequence number (seq #) in the header and includes an RL channel audio data packet in the payload.

FIG. 11(*b*) illustrates an example in which a data packet is configured to include one BIS stream in one BIG.

In FIG. 11(*b*), one BIS includes a header and an audio data packet for each of the RR and RL speakers. Here, each header may include an indicator (RR/RL) indicating that the BIS stream is a data packet for the RR/RL speaker, a time stamp, and a sequence number (seq #).

Table 2 below describes the fields included in the data packet of the PAC format described with reference to FIGS. 9 and 10 and the descriptions of the respective fields.

FIG. 12 shows an example of an operation performed between two speakers and a TV with built-in speakers for providing surround sounds to a user in a 5.1-channel surround sound system.

Referring to FIG. 12(*a*), the audio decoder 1211 of the TV receives an audio stream and performs pulse-code modulation (PCM) data decoding for each of the six channels. The audio stream may be a Dolby 5.1 channel stream or a DTS 5.1 channel stream. The audio decoder 1211 may be a Dolby 5.1 channel decoder.

Among the PCM streams decoded through PCM data decoding, PCM streams FL, FR, C, and W for built-in speakers of the TV may be output through the built-in TV speakers. At this time, PCM streams corresponding to C and W may be downmixed and sent to FL and FR or may be omitted.

Also, the PCM streams for the RL and RR speakers among the PCM streams decoded through PCM data decoding are encoded through the encoder 1213 of the TV. The encoder 1213 of the TV may be an LC3 encoder.

The two encoded streams for the RL and RR speakers are delivered to the BLE Tx interface 1214 of the TV. The BLE Tx interface 1214 groups the received two streams (Connected Isochronous Stream (CIS)) into one stream group (Connected Isochronous Group (CIG)) and transmits the grouped stream to the BLE Rx interface 1221, 1223 of each of the two speakers.

Referring to FIG. 12 (*b*), the BLE Rx interface 1221, 1223 of each speaker receives the CIS. Next, the BLE Rx interface 1221 of the RL speaker may transmit the received CIS to the decoder 1222 of the RL speaker. The decoder 1222 may decode the CIS and deliver the decoded CIS to the speaker driver of the RL speaker, and the speaker driver may output the CIS. Also, the BLE Rx interface 1223 of the RR speaker may transmit the received CIS to the decoder 1224 of the RR speaker. The decoder 1224 may decode the CIS and deliver the decoded CIS to the speaker driver of the RR speaker, and the speaker driver may output the CIS.

FIG. 13 is a flow diagram illustrating an example of an operation performed between three speakers and a TV with built-in speakers in a 5.1 channel surround sound system.

In FIG. 13, the TV 1301 has a built-in FL and FR speakers, and a C speaker may be optionally installed therein. The TV 1301 may operate as an initiator, and the speakers may operate as acceptors.

S1310: The first speaker 1302, the second speaker 1303, and the third speaker 1304 transmit advertisement messages using a general announcement (GA) method or a target announcement (TA) method. Here, the GA may refer to an

TABLE 2

| Field | Description |
| --- | --- |
| Direction | This field takes a single value, either Sink or Source. |
| Codec ID | This field takes a single value, which is the codec identifier defined in the Bluetooth Assigned Numbers. |
| Audio Location | List of Audio Locations. This list has a minimum of one entry. Each entry may be a combination of Audio Locations. |
| Channel Mode | List of Channel Modes. This list has a minimum of one entry. |
| Sampling Frequency | List of Sampling Frequencies. This list has a minimum of one entry. |
| Codec-specific parameters | Variable-size codec-specific parameters defined by a profile. May be empty. |
| Content protection type | This field takes a single value, which is the content protection type defined in Bluetooth Assigned Numbers. |
| Content protection type specific value | Variable-size content protection type specific value defined by a profile. May be empty. | operation method for broadcasting an advertisement message including simple information indicating that a device is ready to receive or provide a specific service. Also, the TA may refer to an operation method for transmitting an advertisement message including information on the role (RR, RL, or W) of a device and decoder performance by setting an address for a specific central device to receive the advertisement message. The TV 1301 receives the advertisement message transmitted to the GA or TA respectively from the first speaker 1302, the second speaker 1303, and the third speaker 1304. Afterward, the TV 1301 may set the TV's built-in speakers as the FL, FR, or C speaker in the 5.1-channel surround sound system. The TV 1301 may determine the positions of the first speaker 1302, the second speaker 1303, and the third speaker 1304 based on the advertisement message transmitted through the TA method.

S1320: The TV 1301 transmits a connection request message to the first speaker 1302, the second speaker 1303, and the third speaker 1304. After that, the TV 1301 may set its role to operate as a central device. When receiving an advertisement message through the TA method in the S1310 step, the TV 1301 may set the first speaker 1302 as a peripheral (RR) based on the advertisement message, set the second speaker 1303 as a peripheral (RL), and set the third speaker 1304 as a peripheral (W) based on the advertisement message. Alternatively, the TV 1301 may determine the positions of the first speaker 1302, the second speaker 1303, and the third speaker 1304 through a published audio capability (PAC) discovery procedure in the connection step with the first speaker 1302, the second speaker 1303, and the third speaker 1304. The TV 1301 may set the role of the first speaker 1302 as the peripheral (RR), set the second speaker 1303 as the peripheral (RL), and set the third speaker 1304 as the peripheral (W) based on the determined positions. The S1320 step may be performed in the GATT layer.

S1330: The TV 1301 transmits a message requesting to form a CIS channel to the first speaker 1302, the second speaker 1303, and the third speaker 1304 respectively to form a CIS channel between the first speaker 1302, the second speaker 1303, and the third speaker 1304. The CIS channel may be a unicast channel. Here, the TV 1301 may correspond to a master device, and the first speaker 1302, the second speaker 1303, and the third speaker 1304 may correspond to a slave device. Afterward, a first CIS channel may be formed between the TV 1301 and the first speaker 1302, a second CIS channel may be formed between the TV 1301 and the second speaker 1303, and a third CIS channel may be formed between the TV 1301 and the third speaker 1304. And the first CIS channel, the second CIS channel, and the third CIS channel may be grouped into one CIG. The TV 1301 may transmit the audio stream of the contents being watched by the user to each of the first speaker 1302, the second speaker 1303, and the third speaker 1304 through the formed first, second, and third CIS channels using the unicast scheme. The S1330 step may be performed in the link layer.

FIG. 14 is an example of an operation performed between three speakers and a TV with built-in speakers for providing surround sounds to a user in a 5.1 channel surround sound system.

Referring to FIG. 14(*a*), the audio decoder 1411 of the TV receives an audio stream and performs pulse-code modulation (PCM) data decoding for each of the six channels. The audio stream may be a Dolby 5.1 channel stream or a DTS 5.1 channel stream. The audio decoder 1211 may be a Dolby 5.1 channel decoder.

Among the PCM streams decoded through PCM data decoding, PCM streams FL, FR, and C for built-in speakers of the TV may be output through the built-in TV speakers. At this time, PCM streams corresponding to C may be downmixed and sent to FL and FR or may be omitted.

Also, the PCM streams for the RL, RR, and W speakers among the PCM streams decoded through PCM data decoding are encoded through the encoder 1413 of the TV. The encoder 1413 of the TV may be an LC3 encoder.

The three encoded streams for the RL, RR, and W speakers are delivered to the BLE Tx interface 1414 of the TV. The BLE Tx interface 1414 groups the received three streams (Connected Isochronous Stream (CIS)) into one stream group (Connected Isochronous Group (CIG)) and transmits the grouped stream to the BLE Rx interface 1421, 1423, 1425 of each of the three speakers.

Referring to FIG. 14 (*b*), the BLE Rx interface 1421, 1423, 1425 of each speaker receives the CIS. Next, the BLE Rx interface 1421 of the W speaker may transmit the received CIS to the decoder 1422 of the W speaker. The decoder 1422 may decode the CIS and deliver the decoded CIS to the speaker driver of the W speaker, and the speaker driver may output the CIS. Also, the BLE Rx interface 1423 of the RL speaker may transmit the received CIS to the decoder 1424 of the RL speaker. The decoder 1424 may decode the CIS and deliver the decoded CIS to the speaker driver of the RL speaker, and the speaker driver may output the CIS. Also, the BLE Rx interface 1425 of the RR speaker may transmit the received CIS to the decoder 1426 of the RR speaker. The decoder 1426 may decode the CIS and deliver the decoded CIS to the speaker driver of the RR speaker, and the speaker driver may output the CIS.

FIG. 15 is a flow diagram illustrating an example of an operation performed between five speakers and a TV with built-in speakers in a 5.1 channel surround sound system.

In FIG. 15, a C speaker may be optionally installed in the TV 1501. The TV 1501 may operate as an initiator, and the speakers may operate as acceptors.

S1510: The first to fifth speakers 1502 to 1506 transmit advertisement messages using a general announcement (GA) method or a target announcement (TA) method. Here, the GA may refer to an operation method for broadcasting an advertisement message including simple information indicating that a device is ready to receive or provide a specific service. Also, the TA may refer to an operation method for transmitting an advertisement message including information on the role (RR, RL, W, FR, or FL) of a device and decoder performance by setting an address for a specific central device to receive the advertisement message. The TV 1501 receives the advertisement message transmitted to the GA or TA respectively from the first to fifth speakers 1502 to 1506. Afterward, the TV 1501 may set the TV's built-in speaker as the C speaker in the 5.1-channel surround sound system. On the other hand, when the TV has no built-in speaker, the TV may not perform the role of a speaker. The TV 1501 may determine the positions of the first to fifth speakers 1502 to 1506 based on the advertisement message transmitted through the TA method.

S1520: The TV 1501 transmits a connection request message to the first to fifth speakers 1502 to 1506. After that, the TV 1501 may set its role to operate as a central device. When receiving an advertisement message through the TA method in the S1510 step, the TV 1501 may set the first to fifth speakers 1502 to 1506 as a peripheral (RR), peripheral (RL), peripheral (W), peripheral (FR), and peripheral (FL) based on the advertisement message. Alternatively, the TV 1501 may determine the positions of the first to fifth speakers 1502 to 1506 through a published audio capability (PAC) discovery procedure in the connection step with the first to fifth speakers 1502 to 1506. The TV 1501 may set the roles of the first to fifth speakers 1502 to 1506 as the peripheral (RR), peripheral (RL), peripheral (W), peripheral (FR), and peripheral (FL) based on the determined positions. The S1520 step may be performed in the GATT layer.

S1530: The TV 1501 transmits a message requesting to form a CIS channel to the first to fifth speakers 1502 to 1506 respectively to form a CIS channel between the first to fifth speakers 1502 to 1506. The CIS channel may be a unicast channel. Here, the TV 1501 may correspond to a master device, and the first to fifth speakers 1502 to 1506 may correspond to a slave device. Afterward, a first CIS channel may be formed between the TV 1501 and the first speaker 1502, a second CIS channel may be formed between the TV 1501 and the second speaker 1503, a third CIS channel may be formed between the TV 1501 and the third speaker 1504, a fourth CIS channel may be formed between the TV 1501 and the fourth speaker 1505, and a fifth CIS channel may be formed between the TV 1501 and the fifth speaker 1506. And the first to fifth CIS channels may be grouped into one CIG. The TV 1501 may transmit the audio stream of the contents being watched by the user to each of the first to fifth speakers 1502 to 1506 through the formed first to fifth CIS channels using the unicast scheme. The S1530 step may be performed in the link layer.

FIG. 16 is a flow diagram illustrating an example of an operation performed between six speakers and a TV without a built-in speaker in a 5.1 channel surround sound system.

In FIG. 16, the TV 1601 may operate as an initiator, and the speakers may operate as acceptors.

S1610: The first to sixth speakers 1602 to 1607 transmit advertisement messages using a general announcement (GA) method or a target announcement (TA) method. Here, the GA may refer to an operation method for broadcasting an advertisement message including simple information indicating that a device is ready to receive or provide a specific service. Also, the TA may refer to an operation method for transmitting an advertisement message including information on the role (RR, RL, W, FR, FL, or C) of a device and decoder performance by setting an address for a specific central device to receive the advertisement message. The TV 1601 receives the advertisement message transmitted to the GA or TA respectively from the first to sixth speakers 1602 to 1607. At this time, since the TV has no built-in speaker, the TV may not perform the role of a speaker. The TV 1601 may determine the positions of the first to sixth speakers 1602 to 1607 based on the advertisement message transmitted through the TA method.

S1620: The TV 1601 transmits a connection request message to the first to sixth speakers 1602 to 1607. After that, the TV 1601 may set its role to operate as a central device. When receiving an advertisement message through the TA method in the S1610 step, the TV 1601 may set the first to sixth speakers 1602 to 1607 as a peripheral (RR), peripheral (RL), peripheral (W), peripheral (FR), peripheral (FL), and peripheral (C) based on the advertisement message. Alternatively, the TV 1601 may determine the positions of the first to sixth speakers 1602 to 1607 through a published audio capability (PAC) discovery procedure in the connection step with the first to sixth speakers 1602 to 1607. The TV 1601 may set the roles of the first to sixth speakers 1602 to 1607 as the peripheral (RR), peripheral (RL), peripheral (W), peripheral (FR), peripheral (FL), and peripheral (C) based on the determined positions. The S1620 step may be performed in the GATT layer.

S1630: The TV 1601 transmits a message requesting to form a CIS channel to the first to sixth speakers 1602 to 1607 respectively to form a CIS channel between the first to sixth speakers 1602 to 1607. The CIS channel may be a unicast channel. Here, the TV 1601 may correspond to a master device, and the first to sixth speakers 1602 to 1607 may correspond to a slave device. Afterward, a first CIS channel may be formed between the TV 1601 and the first speaker 1602, a second CIS channel may be formed between the TV 1601 and the second speaker 1603, a third CIS channel may be formed between the TV 1601 and the third speaker 1604, a fourth CIS channel may be formed between the TV 1601 and the fourth speaker 1605, a fifth CIS channel may be formed between the TV 1601 and the fifth speaker 1606, and a sixth CIS channel may be formed between the TV 1601 and the sixth speaker 1607. And the first to sixth CIS channels may be grouped into one CIG. The TV 1601 may transmit the audio stream of the contents being watched by the user to each of the first to sixth speakers 1602 to 1607 through the formed first to sixth CIS channels using the unicast scheme. The S1630 step may be performed in the link layer.

Method for configuring speaker position (angle) based on Bluetooth direction finding technology (Method 1)

In what follows, a method for a control device to measure the angles between speakers constituting the 5.1 channel surround sound system and the control device and configuring a sweet spot based on the measured angles will be described.

FIG. 17 illustrates examples of speaker arrangements in a 5.1 channel surround sound system.

FIG. 17(a) shows speaker positions for the case of two speakers, FIG. 17(b) shows speaker positions for the case of four speakers, and FIG. 17(c) shows speaker positions for the case of five speakers.

FIG. 18 illustrates examples of sweet spots according to the number of speakers.

FIG. 18(a) shows a sweet spot when there are two speakers. Here, a virtual straight line placed between the TV and the user may be used as the reference point 1801. The angle measured in the clockwise direction from the reference point is defined as a positive angle, and the angle measured in the counterclockwise direction from the reference point is defined as a negative angle.

When there are two speakers, the angle between the RR speaker and the reference point is 110 degrees (degree), and the angle between the RL speaker and the reference point is −110 degrees. In this case, the angle between the reference point and the RR speaker and the angle between the reference point and the RL speaker may allow an error of +/−10 degrees.

FIG. 18(b) shows a sweet spot when there are four speakers. Here, a virtual straight line placed between the TV and the user may be used as the reference point 1802. The angle measured in the clockwise direction from the reference point is defined as a positive angle, and the angle measured in the counterclockwise direction from the reference point is defined as a negative angle.

When there are four speakers, the angle between the RR speaker and the reference point is 110 degrees (degree), and the angle between the RL speaker and the reference point is −110 degrees. In this case, the angle between the reference point and the RR speaker and the angle between the reference point and the RL speaker may allow an error of +/−10 degrees.

Also, the angle between the FR speaker and the reference point is 30 degrees, and the angle between the FL speaker and the reference point is −30 degrees. At this time, the angle between the reference point and the FR speaker and the angle between the reference point and the FL speaker may allow an error of +/−10 degrees.

FIG. 18(*c*) shows a sweet spot when there are five speakers. Here, a virtual straight line placed between the TV and the user may be used as the reference point 1803. The angle measured in the clockwise direction from the reference point is defined as a positive angle, and the angle measured in the counterclockwise direction from the reference point is defined as a negative angle. Since the configuration of FIG. 18(*c*) is the same as that of FIG. 18(*b*) except that the W speaker is additionally involved, further descriptions will be omitted.

FIG. 19 illustrates examples of methods for configuring a reference point in a control device to measure speakers' positions (angles).

FIG. 19(*a*) is an example in which the control device is a remote controller equipped with a plurality of antennas. The control device may adjust the positions of speakers constituting the 5.1 channel surround sound system so that a user may listen to the audio sounds based on the 5.1 channel surround sound system. The control device may measure the positions of the speakers to adjust the positions of the speakers. A reference point may be set in the control device so that the control device may measure the positions of the speakers. A virtual straight line placed between the TV and the control device may be set in the control device as a reference point.

FIG. 19(*b*) is an example in which the control device is a smartphone equipped with a plurality of antennas. Since the case of FIG. 19(*b*) is the same as the case of FIG. 19(*a*) except that the control device is a smartphone, further descriptions will be omitted.

FIG. 19 assumes that the control device is a remote controller or a smartphone. However, it should be understood that various other devices for which a specific reference point is set to measure the speakers' positions may also be used as the control device for adjusting the speakers' positions.

FIG. 20 is a flow diagram illustrating examples of operations for measuring an angle between a control device and a speaker performed by the control device to adjust the speaker's position.

FIG. 20(*a*) illustrates an example in which a control device measures the angle of a speaker (declination angle) based on angle of arrival (AoA) measurement.

The control device receives an advertisement message for angle measurement between the control device and the speaker S2011. The advertisement message may include the Constant Tone Extension (CTE) field used for angle measurement of the control device. The CTE field may be a bit sequence of repeating 0s and 1s.

The control device measures the angle between the reference point set in the control device and the speaker's position based on the advertisement message S2021.

Based on the measured angle, the position of the speaker is adjusted so that the angle between the control device and the speaker satisfies a condition for forming a sweet spot. More specifically, the measured angle is provided to the user, and the user may adjust the speakers' positions to satisfy the condition for forming a sweet spot using the received angle.

When a plurality of speakers constitutes the 5.1 channel surround sound system in which the control system operates, the control device may perform the operations of the S2011 to S2021 steps respectively in conjunction with each of the plurality of speakers.

FIG. 20(*b*) illustrates an example in which a control device measures the angle of a speaker (declination angle) based on angle of departure (AoD) measurement.

The control device broadcasts an advertisement message for measuring an angle between the control device and a speaker S2012. The advertisement message may include the Constant Tone Extension (CTE) field used for angle measurement of the control device. The CTE field may be a bit sequence of repeating 0s and 1s.

The speaker measures the angle between the reference point set in the control device and the speaker's position based on the advertisement message S2022.

The speaker transmits a connection request message to the control device to transmit information on the measured angle, and the control device receives the connection request message S2032. Afterward, the control device transmits a connection response message to the speaker in response to the connection request message, and a connection is established between the control device and the speaker.

Afterward, the control device receives angle information from the speaker S2042.

Based on the received angle information, the position of the speaker is adjusted so that the angle between the control device and the speaker satisfies a condition for forming a sweet spot. More specifically, the angle information is provided to the user, and the user may adjust the speakers' positions to satisfy the condition for forming a sweet spot using the received angle information.

When a plurality of speakers constitutes the 5.1 channel surround sound system in which the control system operates, the control device may perform the operations of the S2012 to S2042 steps respectively in conjunction with each of the plurality of speakers. In other words, the control device may receive angle information from each of the plurality of speakers.

Additionally, to adjust the positions of the speakers, both methods described in FIGS. 20(*a*) and (*b*) may be used. In this case, since both the angle measured by the control device and the angle measured by the speaker may be used, the speakers' positions may be adjusted more accurately than when only one of the methods of FIG. 20(*a*) or (*b*) is used.

Also, the control device may measure the distances between the control device and the speakers to ensure that the speakers are positioned at appropriate distances to provide a 5.1 channel surround sound system. To measure the distances between the speakers' positions, the control device may use information such as the received signal strength of an advertisement message transmitted by the speakers.

FIG. 21 is a flow diagram illustrating an example in which a method for configuring 5.1 surround channels according to the present disclosure is performed.

First, a control device receives advertisement messages from the first and second speakers to measure angles between the control device and the speakers S2110.

Next, the control device measures the angles between a reference point set in the control point and the speakers' positions based on the advertisement messages.

Based on the measured angles, the speakers' positions may be adjusted respectively so that the angles between the control device and the speakers satisfy a condition for forming a sweet spot.

Thereafter, a multi-ch source device performs a procedure for configuring 5.1 surround channels with the first and second speakers to receive audio sounds through the 5.1 channel surround sound system S2120. The multi-ch source device may be a TV.

More specifically, in the S2120 step, the multi-ch source device transmits a connection request for establishing a connection to the first and second speakers. Next, a service and characteristic discovery procedure may be performed among the multi-ch source device and the first and second speakers. After that, the multi-ch source device and the first and second speakers may exchange audio roles, capability information, ASE_ID, and the like. Next, the multi-ch source device and the first and second speakers may exchange information on the codec, quality of service (QoS), and position settings. After that, the multi-ch source device may enable the ASE of the first and second speakers and transmit a periodic advertisement message. Then, the multi-ch source device and the first and second speakers may form 5.1 surround channels, and the multi-ch source device may transmit audio data through the channels to the first and second speakers.

Additionally, the control device may transmit information on the measured positions of the first and second speakers to the multi-ch source device. The operation in which the control device transmits information on the measured positions of the speakers to the multi-ch source device may be performed between the S2110 and S2120 steps. The multi-ch source device may establish 5.1 surround channels with the first and second speakers based on the speakers' positions. In particular, when the multi-ch source device transmits a message for requesting a connection to the first and second speakers, the information on the positions may be used. In this case, the multi-ch source device has the effect of forming a channel for transmitting audio data based on the information on the speakers' positions received from the control device without directly determining the speakers' positions.

FIG. 22 illustrates an example of a packet format of an advertisement message used for a control device to measure a speaker's position.

Unlike the advertisement packet of a general advertisement message, the advertising packet PDU format of an advertisement message used for the control device to measure a speaker's position may include the CTE field inserted at the end of the advertisement packet.

As in a general advertising packet format, Ad-Type metadata is placed in front of the CTE field. Since the 5.1 channel surround profile uses the Advertising packet of the advertisement message used for the control device to measure the speaker's position, the Service Data Ad-Type field may include the 5.1 channel surround profile UUID.

FIG. 23 is a flow diagram illustrating an example in which a control device performs a method for configuring speakers' positions according to the present disclosure.

FIG. 23 illustrates an operation for a control device to measure the angles between the control device and speakers based on the angle of arrival (AoA) measurements of advertisement messages transmitted by the speakers.

First, the control device scans advertisement messages transmitted by the speakers S2310.

Next, the control device determines whether all of the advertisement messages from the speakers constituting the 5.1 channel surround sound system have been scanned S2320.

When the control device determines that not all of the advertisement messages from the speakers have been scanned, the control device perform the S2310 step.

When the control device determines that all of the advertisement messages from the speakers have been scanned, the control device measures the angle between a reference point set in the control device for angle measurement and the speaker's position for each speaker.

Next, the control device determines whether the speakers' positions have been adjusted to satisfy a sweet spot based on the measured angles S2340.

When the control device determines that the speakers' positions have not been adjusted, the control device may perform the operations of the S2310 to S2340 steps again.

When the control device determines that the speakers' positions have been adjusted, the control device stops configuring the speakers' positions.

FIG. 24 is a flow diagram illustrating another example in which a control device performs a method for configuring speakers' positions according to the present disclosure.

FIG. 24 illustrates an operation in which a speaker measures the angle of departure (AoD) based on the advertisement message transmitted by the control device, the control device receives the angle information on the AoD, and the control device measures the angle between the control device and the speaker based on the angle information.

First, the control device broadcasts an advertisement message S2410.

Next, the control device receives a connection request message from each of the speakers that have received the advertisement message 52420. Since the control device has to receive the angle information on the AoD from the speaker to configure the speaker's position based on the AoD measured by the speaker, the control device has to establish a connection to the speakers.

Next, the control device determines whether a connection has been established to all of the speakers S2430.

When the control device determines that not all of the speakers have been connected to the control device, the control device may again perform the operation in the S2430 step.

On the other hand, when the control device determines that all of the speakers are connected, the control device receives angle information respectively from the speakers S2440.

Next, the control device determines whether the speakers' positions have been adjusted based on the angle information S2450. To determine whether the speakers' positions have been adjusted, the control device may compare AoD included in the angle information with information related to the condition of a sweet spot preconfigured in the control device.

When the control device determines that the speakers' positions have not been adjusted, the control device may perform the operations of the S2410 to S2440 steps again.

When the control device determines that the speakers' positions have been adjusted, the control device releases the connection to the speakers S2460 and stops configuring the speakers' positions.

Method for adjusting the audio sound output angle of a speaker (Method 2)

In what follows, described will be a method for a control device to measure the audio sound output angles of speakers constituting a 5.1 channel surround sound system and adjust the audio sound output angles to make audio sounds output from the speakers incident at right angles to the control device.

FIG. 25 illustrates an example of configuring speakers' audio sound output angles.

FIG. 25 illustrates an example in which the angle of audio sound output from a speaker (hereinafter, a voice signal) is configured to make the voice signal incident at a right angle to a control device (user). More specifically, FIG. 25 shows that the voice signals output from the FR speaker 2502 and the RR speaker 2503 are incident at right angles to the control device (user).

Different from the example of FIG. 25, when the audio signal output angle of the speaker is not configured appropriately, the 5.1 channel surround sound system may not operate properly even if the speaker's position is configured to satisfy a sweet spot.

FIG. 26 is a flow diagram illustrating an example in which a method for adjusting speakers' audio sound output angles according to the present disclosure is performed between a control device and the speakers.

First, the control device receives an advertisement message respectively from a first speaker and a second speaker S2610.

Since the advertisement message is not meant for the control device to measure the positions (angles) of the first and second speakers, the advertisement message may not include the CTE field.

Next, the control device transmits a connection request message for forming a connection to the first and second speakers in response to the advertisement message S2620.

After the connection between the control device and the first speaker and the second speaker is formed, the control device receives a voice signal (audio sound) from the first and second speakers, respectively, and measures the volume of the received voice signal S2630.

The voice signal output angles of the first and second speakers may be adjusted based on the volume of the audio signals measured by the control device. More specifically, the control device may calculate values for adjusting the audio output angles of the first and second speakers based on the measured volume. The voice signal output angles of the first and second speakers may be adjusted based on the calculated values. The control device may transmit information on a value for adjusting the audio signal output angle to the first and second speakers. At this time, if it is the case that the first and second speakers are equipped with a built-in motor for adjusting the voice signal output angle, the first and second speakers may adjust their voice signal output angle directly based on the information on the value for adjusting the voice signal output angle.

Afterward, the control device may receive a voice signal from the first and second speakers with adjusted positions and voice signal output angles.

FIG. 27 is a flow diagram illustrating an example in which a control device performs a method for adjusting speakers' audio sound output angles according to the present disclosure.

The example of FIG. 27 assumes that the control device has already established a connection with speakers constituting a 5.1 channel surround sound system.

First, the control device sets the volume to the same level for the speakers S2710.

Next, the control device receives voice signals from the speakers, respectively, and determines whether the volume levels of the speakers are the same by measuring the volume of each received voice signal S2720. Here, it is assumed that the volume level of each speaker is the same, and the voice signals output from the respective speakers are incident at right angles to the control device. To measure the volume of the voice signal, the control device may divide the frequency band in units of 100 Hz, 200 Hz, and 1000 Hz, monotonically; measure the sound pressure level (SPL) for each frequency band; and calculate a weighted average of the SPLs using the psycho-acoustic model. Alternatively, the control device may obtain the SPL at once with a synthesized multi-tone for the convenience of UX. In this case, since a portable BT speaker does not need to have high sensitivity, the synthesized multi-tone may reduce the test time.

In the S2720 step, when the control device determines that the volume of each speaker is at the same level, the control device terminates the operation for adjusting the audio sound output angle of the speaker.

On the other hand, when the control device determines that the volume of each speaker is not at the same level, the control device selects one from among the speakers and adjusts the voice signal output angle of the selected speaker S2730.

Next, the control device determines whether the volume of the angle-adjusted speaker is at the maximum volume S2740. In other words, since the control device may know the volume size configured for each speaker, the control device may determine whether the volume of an angle-adjusted speaker is measured at its maximum volume by comparing the information on the volume size configured for each speaker and the volume of a received voice signal.

When the control device determines that the volume of the angle-adjusted speaker is not at the maximum volume, the control device may perform the S2730 step again.

On the other hand, when the control device determines that the volume of the angle-adjusted speaker is at the maximum volume, the control device selects the next speaker and adjusts the voice signal output angle S2750.

Next, the control device determines whether the voice signal output angle has been adjusted for all of the speakers S2760.

When the control device determines that the voice signal output angle has not been adjusted for all of the speakers, the control device may repeat the S2730 to S2760 steps.

On the other hand, when the control device determines that the voice signal output angle has been adjusted for all of the speakers, the control device terminates the operation for adjusting the audio sound output angles of the speakers.

AoA and AoD Measurement

FIG. 28 illustrates an example in which a control device measures AoA.

Referring to FIG. 28(a), in the case of AoA, since a control device equipped with a plurality of antennas receives a signal from an external positioning device (Tx), a connection between the control device and the external positioning device is not required.

Referring to FIG. 28(b), the antennas installed on the control device are separated by a predetermined distance d. The control device may use the following equation for AoA measurement.

$$\psi = (2\pi d \cos(\theta))/\lambda$$

$$\theta = \cos^{-1}((\psi\lambda)/(2\pi d)) \quad \text{[Eq. 1]}$$

In Eq. 1, $\psi$ represents a phase difference between signals received from the antennas installed on the control device. Also, $\lambda$ represents the wavelength of a signal transmitted by the external positioning device. The control device may calculate the AoA value through the $\theta$ value.

In other words, AoA may be calculated based on the distance between antennas installed on the control device, the wavelength of a signal transmitted by the external positioning device, and the phase difference between signals received at a plurality of Rx antennas of the control device.

FIG. 29 illustrates an example in which a control device measures AoD.

Referring to FIG. 29(a), in the case of AoD, since a control device equipped with one antenna receives a signal from an external positioning device (Tx) equipped with a plurality of antennas, and the control device transmits AoD measurements to the external positioning device, a connection between the control device and the external positioning device is required.

Referring to FIG. 29(b), antennas installed on the external positioning device is separated by a predetermined distance d. The control device may use the following equation for AoD measurement.

$$\psi = (2\pi d \sin(\theta))/\lambda,$$

$$\theta = \sin^{-1}((\psi\lambda)/(2\pi d))$$

$$\sin\theta = (\psi/2\pi)\lambda/d \quad [\text{Eq. 2}]$$

In Eq. 2, $\psi$ represents a phase difference measured at the Rx block of the control device between signals transmitted from the antennas installed on the external positioning device. Also, $\lambda$ represents the wavelength of a signal transmitted by the external positioning device. The control device may calculate the AoD value through the $\theta$ value.

In other words, AoD may be calculated based on the distance between antennas installed on the external positioning device, the wavelength of a signal transmitted by the external positioning device, and the phase difference measured at the Rx antenna block of the control device between signals transmitted through different antennas of the external positioning device.

FIG. 30 illustrates an example in which a control device performs a method for measuring speakers' positions and adjusting the speakers' voice signal output angles according to the present disclosure.

FIG. 30 assumes a situation in which two speakers are involved.

The control device measures the angle between a reference point set in the control device and each speaker's position for angle measurement based on at least one of AoA or AoD scheme.

Next, based on the measured angle, the positions of the two speakers may be adjusted. In the case of two speakers, the angle between the control device and one of the speakers may be adjusted to be either 110 degrees or −110 degrees.

Afterward, the control device establishes a connection with the two speakers and receives a voice signal from the two speakers, respectively. The control device measures the volume of each received voice signal and determines whether the voice signal output angles of the two speakers are set to be incident to the control device at right angles.

Next, when the control device determines that the voice signal output angles of the two speakers are not set to be incident to the control device at right angles, the control device may adjust the voice signal output angles of the two speakers.

FIG. 31 illustrates another example in which a control device performs a method for measuring speakers' positions and adjusting the speakers' voice signal output angles according to the present disclosure.

FIG. 31 assumes a situation in which four speakers are involved.

Since the case of FIG. 31 is the same as the case of FIG. 30 except that two more speakers are added, further descriptions will be omitted.

FIG. 32 is a flow diagram illustrating an example in which a control device performs a method for receiving a voice signal from at least one device according to the present disclosure.

More specifically, in a method for a control device to receive a voice signal from at least one device in a short-range wireless communication system, the control device receives a first advertisement message for measuring a declination angle between devices from the at least one device S3210.

Here, the first advertisement message may include a data field for the control device to measure the first declination angle, and the data field may be the constant tone extension (CTE) field.

Also, the CTE field may be a bit sequence of repeating 0s and 1s.

Next, the control device measures each declination angle between a reference point set in the control device and positions of the at least one device based on the first advertisement message S3220.

Here, based on the measured respective declination angles, the positions of the at least one device are respectively adjusted so that each declination angle satisfies a specific angle for receiving a voice signal.

Here, the respective declination angles may be calculated based on the distance between a plurality of antennas included in the control device, the wavelength of the first advertisement messages transmitted respectively by the at least one device, and the phase difference between the first advertisement messages received respectively by the plurality of antennas.

Next, the control device receives each of the first voice signals based on the respective adjusted positions from the at least one device S3230.

Afterward, the control device measures the volume of the first voice signals received respectively S3240.

At this time, based on the measured volume, the voice signal output angles of the at least one device are adjusted respectively so that the voice signals received by the control device are incident to the control device at right angles.

In addition, the control device may further receive a second voice signal from the at least one device based on (i) the respectively adjusted positions and (ii) the respectively adjusted voice signal output angles of the at least one device.

Also, the control device may further perform the operation of receiving, respectively from the at least one device, a second advertisement message for establishing a connection for measuring the volume of the first voice signal; transmitting a connection request message to the at least one device based on the second advertisement message, respectively; and receiving, respectively from the at least one device, a connection response message in response to the connection request message.

Here, the second advertisement message may not include the CTE field.

In addition, the control device may further perform the operation of broadcasting, to the at least one device, a second advertisement message for measuring an angle between devices through the plurality of antennas; receiving a connection request message from the at least one device, respectively; transmitting, to the at least one device, a connection response message in response to the connection request message, respectively; and receiving, respectively from the at least one device, each of the declination information.

Here, each of the declination information may include information on a specific declination angle between the reference point set in the control device and a location of a specific device among the at least one device, and the specific declination angle may be measured based on the second advertisement message.

Also, the specific declination may be calculated based on the distance between the plurality of antennas, the wavelength of the second advertisement message each broadcast through the plurality of antennas, and the phase difference at a receiving end of the specific device between the second advertisement messages broadcast respectively through the plurality of antennas.

Also, the positions of the at least one device may be adjusted further based on the declination information each received from the at least one device.

It is apparent to those skilled in the art that the present invention can be embodied in other specific forms without departing from the essential characteristics of the present invention. Accordingly, the foregoing detailed description should not be construed as restrictive in all respects but as exemplary. The scope of the present invention should be determined by a reasonable interpretation of the appended claims, and all modifications within the equivalent scope of the present invention are included in the scope of the present invention.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. Further, although the disclosure has described both product inventions and process inventions, description of both inventions may be complementarily applied as needed.

INDUSTRIAL APPLICABILITY

The preferred embodiments of the present disclosure described above are disclosed for an exemplary purpose, and modifications, changes, substitutions, or additions of various other embodiments may be hereinafter made by those skilled in the art within the technical spirit and the technical scope of the present disclosure disclosed in the appended claims.

What is claimed is:

1. A method for a control device to receive a voice signal from at least one device in a short-range wireless communication system, the method comprising:
   receiving a first advertisement message for measuring a declination angle between devices from the at least one device, respectively;
   measuring each declination angle between a reference point set in the control device and positions of the at least one device based on the first advertisement message, wherein the positions of the at least one device are respectively adjusted such that each declination angle satisfies a specific angle for receiving a voice signal, based on the measured respective declination angles;
   receiving each of a first voice signals based on the respective adjusted positions from the at least one device; and
   measuring a volume of the received first voice signal, respectively,
   wherein based on the measured volume, an audio signal output angle of the at least one device is adjusted such that an audio signal received by the control device is incident at right angles to the control device, respectively.

2. The method of claim 1, further comprising:
   receiving a second voice signal, from the at least one device, based on (i) the respectively adjusted positions and (ii) the respectively adjusted voice signal output angle of the at least one device.

3. The method of claim 2,
   wherein the specific declination is calculated based on the distance between the plurality of antennas, the wavelength of the second advertisement message each broadcast through the plurality of antennas, and a phase difference at a receiving end of the specific device between the second advertisement messages, respectively broadcast through the plurality of antennas.

4. The method of claim 3,
   wherein the positions of the at least one device are adjusted further based on the declination information each received from the at least one device.

5. The method of claim 1, further comprising:
receiving, respectively from the at least one device, a second advertisement message for establishing a connection for measuring the volume of the first voice signal;
transmitting a connection request message to the at least one device based on the second advertisement message, respectively; and
receiving, respectively from the at least one device, a connection response message in response to the connection request message.

6. The method of claim 5,
wherein the first advertisement message includes a data field for the control device to measure the respective first declination angle, and
wherein the data field is a constant tone extension (CTE) field.

7. The method of claim 6,
wherein the CTE field is a sequence of bits in which '0' and '1' are repeated.

8. The method of claim 7,
wherein the second advertisement message does not include the CTE field.

9. The method of claim 1,
wherein each of the declination angles is calculated based on a distance between a plurality of antennas included in the control device, a wavelength of the first advertisement message transmitted by the at least one device, and a phase difference between the first advertisement messages respectively received at a side of the plurality of antenna.

10. The method of claim 9, further comprising:
broadcasting, to the at least one device, a second advertisement message for measuring an angle between devices through the plurality of antennas;
receiving a connection request message from the at least one device, respectively;
transmitting, to the at least one device, a connection response message in response to the connection request message, respectively; and
receiving, respectively from the at least one device, each of the declination information, wherein each of the declination information includes information on a specific declination angle between the reference point set in the control device and a location of a specific device among the at least one device, and
wherein the specific declination angle is measured based on the second advertisement message.

11. A control device for receiving a voice signal from at least one device in a short-range wireless communication system, the control device comprising:
a transmitter for transmitting a radio signal;
a receiver for receiving a radio signal; and
a processor operatively connected to the transmitter and the receiver;
wherein the processor is configured to control:
the receiver to receive a first advertisement message for measuring a declination angle between devices from the at least one device, respectively;
to measure each declination angle between a reference point set in the control device and positions of the at least one device based on the first advertisement message,
wherein the positions of the at least one device are respectively adjusted such that each declination angle satisfies a specific angle for receiving a voice signal, based on the measured respective declination angles;
the receiver to receive each of a first voice signals based on the respective adjusted positions from the at least one device; and
to measure a volume of the received first voice signal, respectively,
wherein based on the measured volume, an audio signal output angle of the at least one device is adjusted such that an audio signal received by the control device is incident at right angles to the control device, respectively.

12. The control device of claim 11,
wherein the processor is further configured to control:
the receiver to receive a second voice signal, from the at least one device, based on (i) the respectively adjusted positions and (ii) the respectively adjusted voice signal output angle of the at least one device.

13. The control device of claim 11,
wherein the processor is further configured to control:
the receiver to receive, respectively from the at least one device, a second advertisement message for establishing a connection for measuring the volume of the first voice signal;
the transmitter to transmit a connection request message to the at least one device based on the second advertisement message, respectively; and
the receiver to receive, respectively from the at least one device, a connection response message in response to the connection request message.

14. The control device of claim 13,
wherein the first advertisement message includes a data field for the control device to measure the respective first declination angle, and
wherein the data field is a constant tone extension (CTE) field.

15. The control device of claim 14,
wherein the CTE field is a sequence of bits in which '0' and '1' are repeated.

* * * * *